US009779451B2

(12) United States Patent
Fisher

(10) Patent No.: US 9,779,451 B2
(45) Date of Patent: Oct. 3, 2017

(54) SYSTEM AND METHOD OF ACCESSING AN ONLINE AUCTION OF A VEHICLE THROUGH AN AUCTION WEBSITE AND A DEALER WEBSITE

(71) Applicant: ON THE BLOCK, LLC, Urbandale, IA (US)

(72) Inventor: Chad C. Fisher, Urbandale, IA (US)

(73) Assignee: ON THE BLOCK, L.L.C., Urbandale, IA (US)

( * ) Notice: Subject to any disclaimer, the term of this patent is extended or adjusted under 35 U.S.C. 154(b) by 0 days.

(21) Appl. No.: 14/435,968

(22) PCT Filed: Apr. 24, 2014

(86) PCT No.: PCT/US2014/035367
§ 371 (c)(1),
(2) Date: Apr. 15, 2015

(87) PCT Pub. No.: WO2014/176462
PCT Pub. Date: Oct. 30, 2014

(65) Prior Publication Data
US 2015/0254762 A1    Sep. 10, 2015

Related U.S. Application Data

(60) Provisional application No. 61/815,309, filed on Apr. 24, 2013.

(51) Int. Cl.
*G06Q 30/08* (2012.01)
*G06Q 30/02* (2012.01)

(52) U.S. Cl.
CPC ......... *G06Q 30/08* (2013.01); *G06Q 30/0275* (2013.01)

(58) Field of Classification Search
CPC .................................................. G06C 30/0275
(Continued)

(56) References Cited

U.S. PATENT DOCUMENTS

| 4,989,144 A | 1/1991 | Barnett |
| 5,063,507 A | 11/1991 | Lindsey |

(Continued)

FOREIGN PATENT DOCUMENTS

| WO | 2007035195 A2 | 3/2007 |
| WO | 2013177174 A2 | 11/2013 |

(Continued)

OTHER PUBLICATIONS

International Search Report of International Application No. PCT/US2013/056015, dated Feb. 14, 2014, 4 pages, International Searching Authority, Alexandria, Virginia, USA.

(Continued)

*Primary Examiner* — Mila Airapetian
(74) *Attorney, Agent, or Firm* — VLP Law Group, LLP

(57) ABSTRACT

A system for auctioning a vehicle through the internet and through the collaboration of a vehicle dealer and an auction house. The system includes a vehicle dealer having their own website, and an auction house having their own website. Through collaboration between the vehicle dealer and the auction house various other cobranded websites are presented for the auction of vehicles. These cobranded websites are accessible either through the vehicle dealer website or the auction house website, and are either hosted on the vehicle dealer website or the auction house website. In this way, greater access is provided to the vehicle auction while maintaining the continuity of experience for the buyer, thereby increasing sales and internet traffic.

18 Claims, 22 Drawing Sheets

(58) Field of Classification Search
USPC .................................................... 705/14.71
See application file for complete search history.

(56) References Cited

U.S. PATENT DOCUMENTS

| | | | |
|---|---|---|---|
| 5,285,383 | A | 2/1994 | Lindsey |
| 5,325,291 | A | 6/1994 | Garrett |
| 5,521,815 | A | 5/1996 | Rose |
| 6,076,064 | A | 6/2000 | Rose |
| 6,259,354 | B1 | 7/2001 | Underwood |
| 7,113,853 | B2 | 9/2006 | Hecklinger |
| 7,228,298 | B1 | 6/2007 | Raines |
| 7,349,870 | B1 | 3/2008 | Mahoney |
| 7,392,220 | B1 | 6/2008 | Altarescu |
| 7,421,322 | B1 | 9/2008 | Silversmith |
| 7,505,838 | B2 | 3/2009 | Raines |
| 7,711,608 | B2 | 5/2010 | Asami |
| 7,908,180 | B2 | 3/2011 | Goclowski |
| 8,095,458 | B2 | 1/2012 | Peterson |
| 8,112,314 | B2 | 2/2012 | Patel |
| 8,145,541 | B2 | 3/2012 | Mohan |
| 8,185,413 | B2 | 5/2012 | Melnick |
| 8,219,458 | B1 | 7/2012 | Lark |
| 8,725,581 | B2 | 5/2014 | Breed |
| 2002/0103721 | A1* | 8/2002 | Wiesehuegel .......... G06Q 30/02 705/27.1 |
| 2002/0143646 | A1 | 10/2002 | Boyden et al. |
| 2005/0091140 | A1* | 4/2005 | Sloan .................... G06Q 40/04 705/37 |
| 2010/0070382 | A1 | 3/2010 | Inghelbrecht et al. |
| 2010/0211440 | A1 | 8/2010 | Leshem |
| 2010/0299213 | A1 | 11/2010 | Yeganeh |
| 2010/0312591 | A1 | 12/2010 | Wu |
| 2011/0161193 | A1 | 6/2011 | Heppe |
| 2013/0054404 | A1 | 2/2013 | Garcia |

FOREIGN PATENT DOCUMENTS

| | | |
|---|---|---|
| WO | 2013177500 A1 | 11/2013 |
| WO | 2014031761 A2 | 2/2014 |

OTHER PUBLICATIONS

International Search Report of International Pat. App. No. PCT/US2014/035367, dated Sep. 23, 2014, two pages, International Searching Authority, Alexandria, VA.

\* cited by examiner

SYSTEM AND METHOD OF ACCESSING AN ONLINE AUCTION OF A VEHICLE THROUGH AN AUCTION WEBSITE AND A DEALER WEBSITE

RELATED APPLICATIONS

This application is a 35 U.S.C. 371 national stage filing from International Application No. PCT/US2014/035367, filed Apr. 24, 2014, which claims priority to U.S. Provisional Application No. 61/815,309, filed Apr. 24, 2013, the teachings of which are incorporated herein by reference.

BACKGROUND OF INVENTION

This invention relates to vehicle sales. More specifically, and without limitation, this invention relates to vehicle sales through the internet.

Since the mass adoption of the internet, sales of products over the internet have steadily increased. This has included sales of vehicles. However, considering that each vehicle, especially used vehicles, is inherently unique in nature, this presents various complexities to traditional online sales. Namely, it is difficult to put a specific price on vehicles because of the wide variety of features (such as color, sunroof, leather, etc.) and the varying condition of each vehicle (such as miles, damage, wear and tear, etc.).

Various entities have attempted to address these problems in various ways. Entities such as cars.com, autos.com and autotrader.com offer websites wherein sellers can list their vehicle for sale and buyers can search for vehicles to buy. This requires entry of vehicle-related information into the site by the seller, which can then be searched by the buyer. These entities essentially offer an online classified ad.

Other entities such as ebay.com, copart.com and adesa.com offer online auctions for vehicles. Through these websites a user can list their vehicle for auction and buyers can bid on the vehicle.

While these entities and the services they offer are helpful, they have their deficiencies. Namely, the services these entities offer are limited. That is, these sites merely offer vehicles for sale or offer auctions for vehicles while failing to address the buyer's and seller's other unmet needs.

Therefore, problems regarding the online sale of vehicles have not been addressed.

Thus it is a primary object of the invention to provide a system and method that improves upon the state of the art.

Another object of the invention is to improve the efficiency of transacting vehicle purchases.

Yet another object of the invention is to improve the security of buying and selling vehicles on line.

Another object of the invention is to improve the pricing mechanics of an online vehicle auction by requiring each vehicle auction to have a floor and ceiling price wherein the system sets the maximum values of those prices. This arrangement will ensure sellers obtain equal or higher selling prices than they might otherwise receive at a local vehicle auction while buyers will be able to purchase vehicles at a lesser amount than they might otherwise find at a dealership.

Yet another object of the invention is to provide a single system wherein a seller can list a vehicle for sale, auction a vehicle, lease a vehicle, swap a lease, and have a vehicle purchased at auction on their behalf.

Another object of the invention is to provide a single system wherein a buyer can search for a vehicle and see combined results in one search page for all such vehicles and similar vehicles which are available for sale, vehicles for auction, and vehicles available for a lease or lease swap, thereby presenting the buyer with more options than he or she may have previously considered and improving the rate in which vehicles are transacted online.

Yet another object of the invention is to provide a proprietary system for online vehicle auctions whereby sellers are able to obtain a higher average sales price for their vehicles than they could otherwise receive at any existing online website or live physical auction house, while at the same time, buyers are able to purchase vehicles at a lesser average sales price than they could otherwise find at any existing online website or physical dealership.

These and other objects, features, or advantages of the invention will become apparent from the specification, drawings and claims.

SUMMARY OF THE INVENTION

A system for transacting vehicle sales and purchases through the internet is presented. The system includes a standard listing section wherein a vehicle is listed for sale; an auction block section wherein a vehicle is auctioned off wherein a system-mandated maximum floor and maximum ceiling price are set; a concierge service wherein a concierge handles the entire purchase process for a buyer for a fee; a lease swap service which provides a marketplace where leased vehicles are transferred and leases assigned and assumed; a trade in service wherein offers are solicited for trading in a vehicle; and a vehicle enthusiast section, wherein users can post information and pictures on enthusiast webpages for their vehicles which are posted for the purpose of publicly displaying details about their vehicles but not necessarily for the sale or auction of their vehicles. The standard listing tab facilitates transactions by providing both buyers and sellers a digital portal to negotiate and finalize transaction terms remotely. The system also provides the parties real timely data with regards to pricing, financing, transportation costs, vehicle history reports, third-party vehicle history inspections, and access to certified pre-owned vehicle programs and warranty programs. The system also provides a method of presenting a bid calling webpage on an auction house website as well as on a vehicle dealer website. This portfolio of services is a significant improvement over the current state of art and will reduce transaction time and costs, while providing both parties a higher degree of confidence when transacting for vehicles.

BRIEF DESCRIPTION OF THE DRAWINGS

Figure 10:
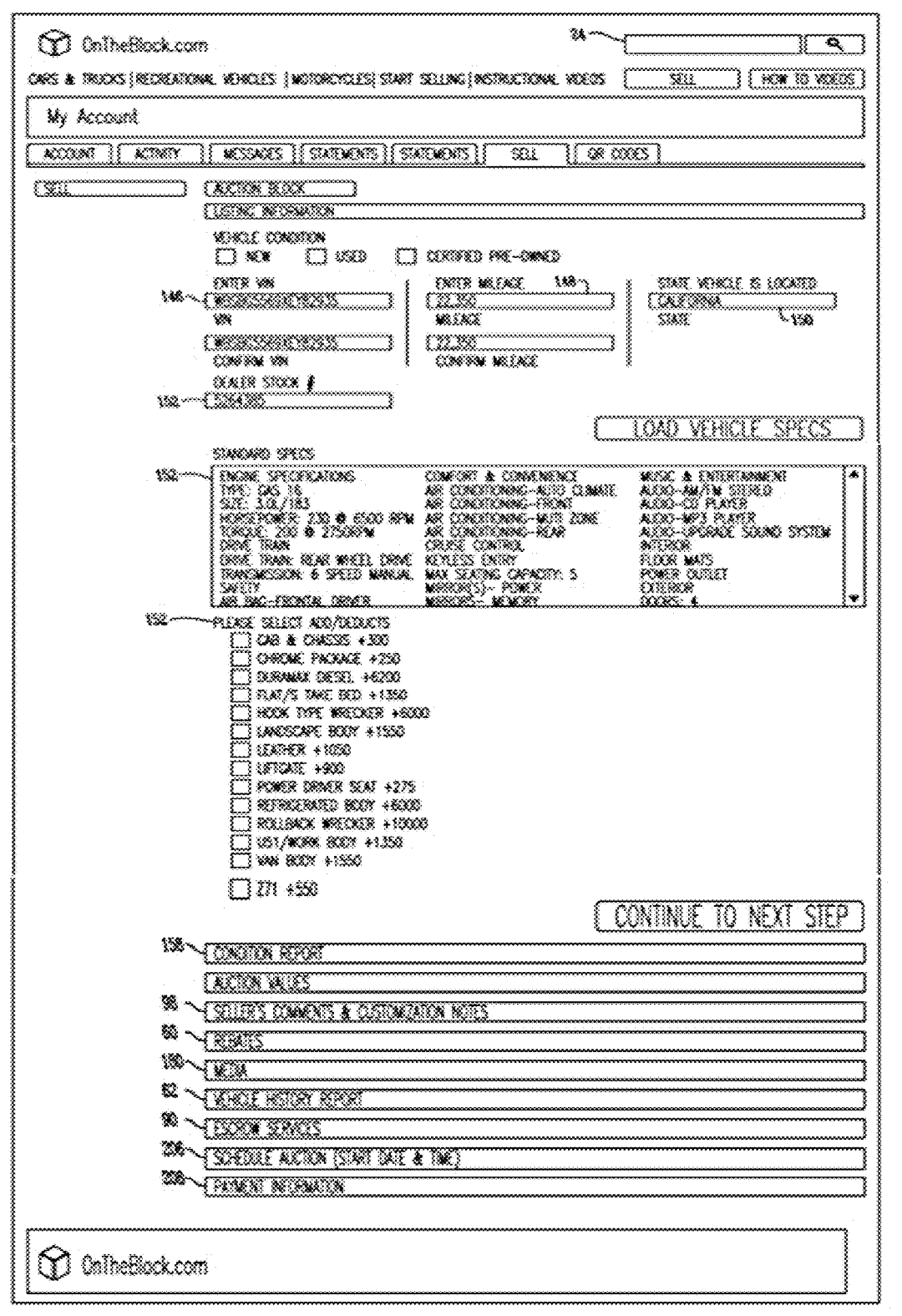

FIG. 10 is a plan view of the listing information page of the system.

Figure 11:
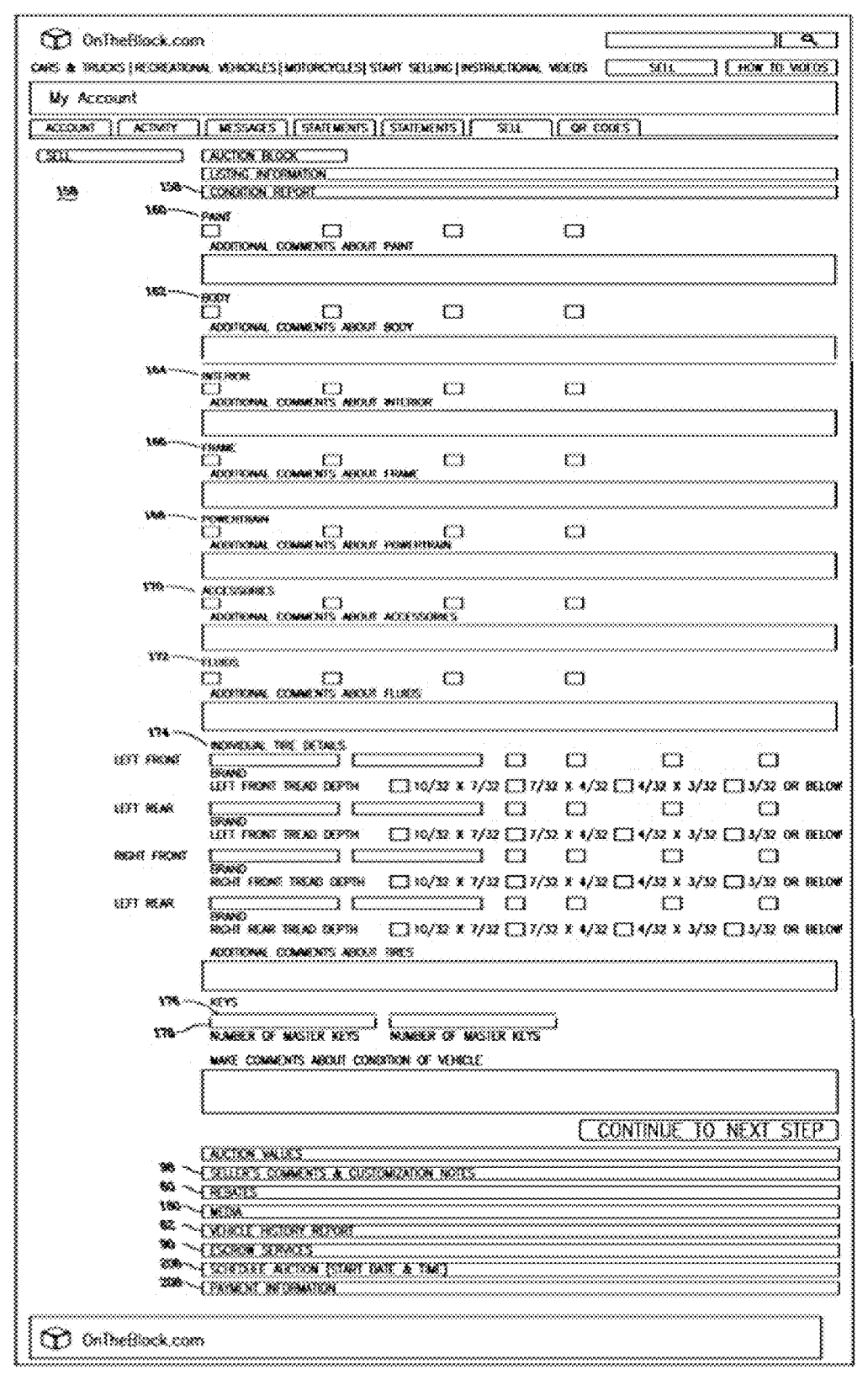

FIG. 11 is a plan view of the user generated condition report of the system.

Figure 12:
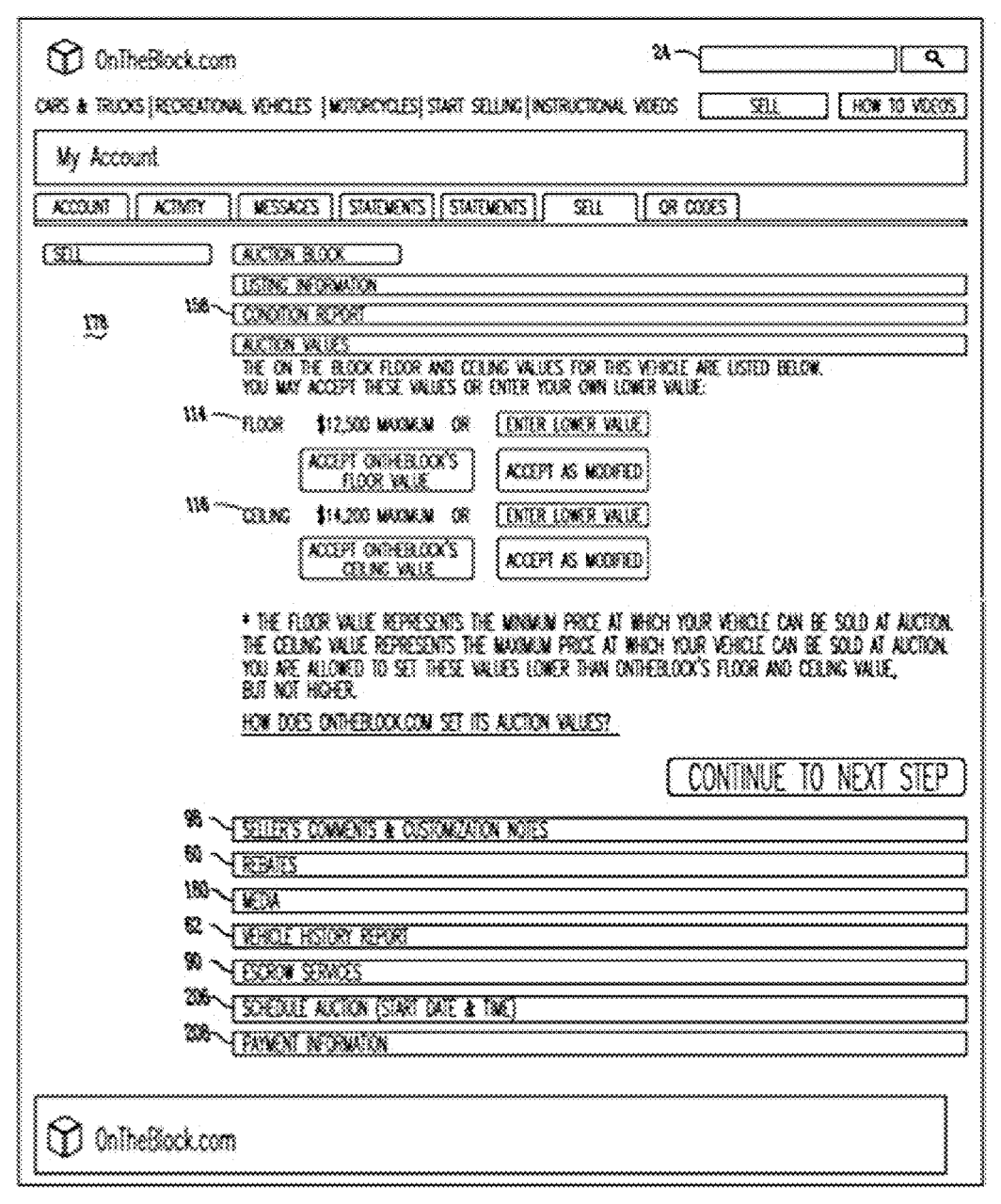

FIG. 12 is a plan view of the auction values page of the system.

DETAILED DESCRIPTION OF THE INVENTION

Figure 1:
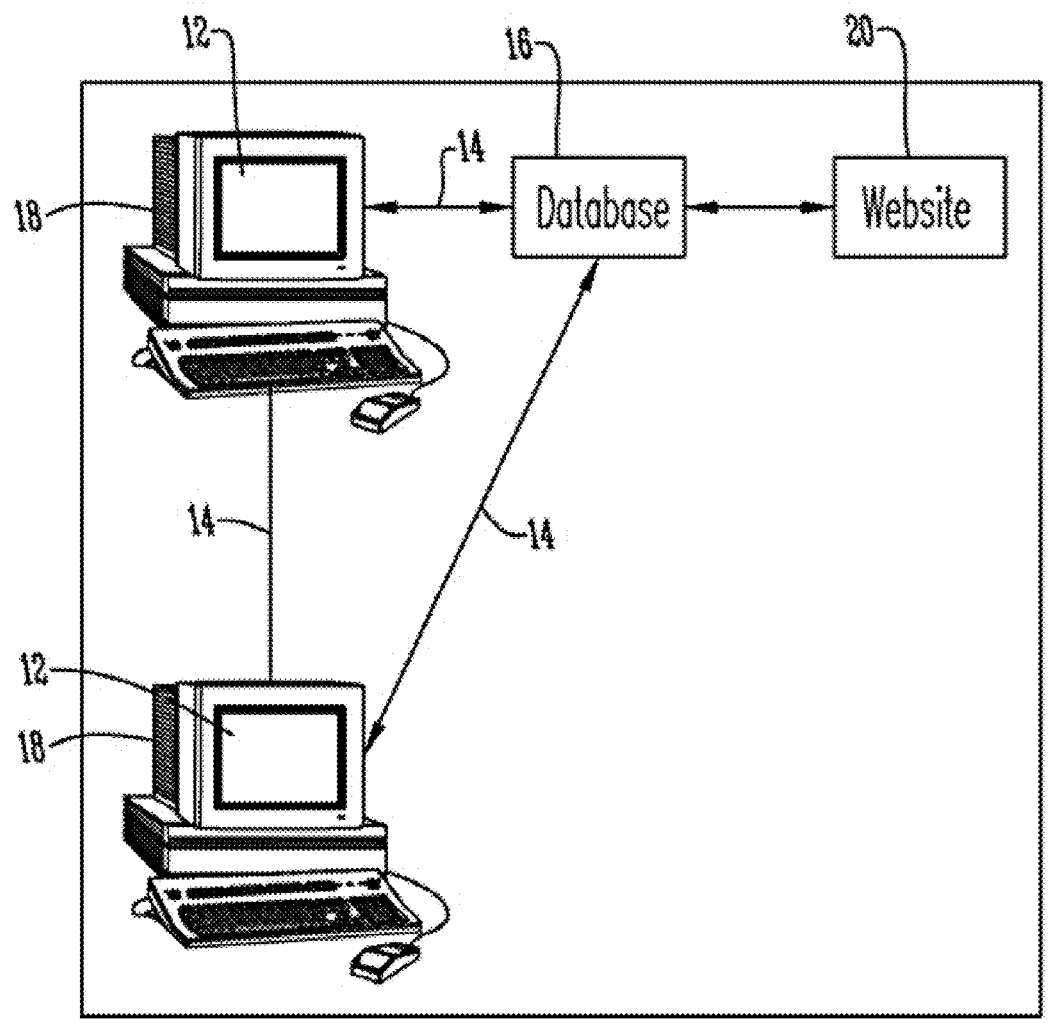
FIG. 1 is a plan view of the system.
Figure 2:
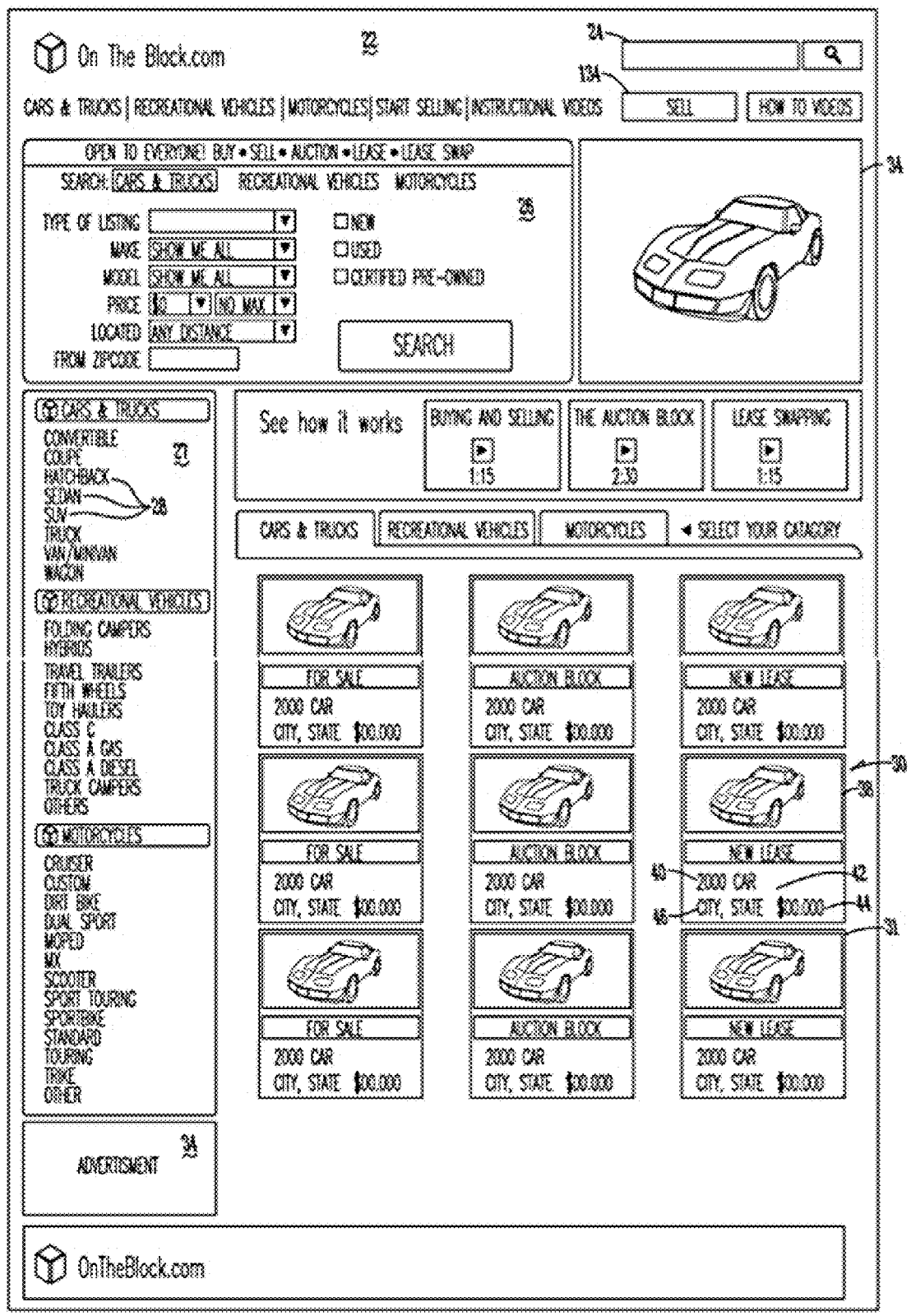
FIG. 2 is a plan view of the homepage of the system.

With reference to the drawings, a system 10 is presented for online vehicle transactions. For the purposes of this disclosure, the term "vehicle" is defined broadly to include all vehicles, including cars, trucks, motorcycles, marine (boats), agriculture equipment, construction equipment, motorhomes/campers, RVs, and aircraft, and any other motorized device. The system 10 includes an interactive user interface 12 connected by an electronic network 14 (such as the internet) to a database 16 through a computing device 18 to a website 20. Interactive user interface 12 is any visual display, such as a computer screen, or the like, that displays information and allows for user interaction thereof. Electronic network 14 is any type of a connection to a network of computing devices that allows for the transfer and exchange of data and information, either through wired connection or wireless connection. Database 16 is any method or means of storing data such as hard drives, flash drives, memory, the cloud, a server or the like. Computing device 18 is any electronic device which sends and receives information over electronic network 14 and is capable of interpreting and displaying information on an interactive user interface 12. Computing device 18 includes, but is not limited to, desktop computers, desktop computers, laptop computers, smartphones, cell phones, tablet computers, portable computers, iPads®, iPhones®, Android® devices, BlackBerries®, or the like.

Website 20 offers a portfolio of tabs directed to various service offerings. These tabs include standard listing tab 100, auction block tab 200, concierge service tab 300, lease and lease swap tab 400, trade in tab 500, enthusiast tab 600, among other user interactive features.

Searching—Homepage:

The website 20 begins with a homepage 22. The homepage 22 includes a quick search box 24. Quick search box 24 enables a user to enter search terms quickly and easily into a single search line. The homepage 22 also includes a structured search box 26 which allows a user to conduct a structured search. The structured search box 26 includes various guided sections that a user can type information into or select a common search term from, such as: "Type of Listing", "Make", "Model", "Price", "Location", "Zip Code", "New", "Used", "Certified", etc. The homepage 22 also includes a search criteria box 27 which includes various search categories 28 (described further herein) that can be entered or selected to narrow the search results. The homepage 22 also includes a featured vehicles section 30 which displays a plurality of interactive individual vehicle ads 31 as will be described further herein. The homepage 22 also includes a plurality of how to videos 32 and various advertisements 34 among other information.

When searching, as the user enters information into or selects information from the search criteria box 27, the system 10 accesses database 16 or accesses a third party database containing vehicle information and populates the other categories, in real-time, with pertinent selections that are applicable based on the prior selected categories and information. In this way the search criteria continues to narrow or get more specific based on the user's prior selections. As these categories are selected, the results are populated in real-time continually offering the user the most pertinent results. When a user finds a vehicle listing they are interested in inspecting further they select or click on the specific vehicle ad 31. This takes the user to a page dedicated to the specific vehicle (as will be described further herein).

Results Page:

After a search is performed by a user by entering information into the quick search box 24 or by entering and/or selecting information into/from the structured search box 26, the results page 36 is presented. A unique feature of the website 20 is that any search performed by a user results in the results page 36 being presented. The results page 36 contains results for all vehicles matching the search terms and separated into the following categories: standard listing tab 100, auction block tab 200, and lease and lease swap tab 300, among others. In this way, the buyer is presented with more information and more options than he or she may have anticipated which has the potential to lead to more transactions. For example, a buyer who originally conducted a search with the intent of purchasing a vehicle, may, upon seeing the current vehicles that are being auctioned or offered for a lease or a lease swap may choose to bid on an auctioned vehicle or lease a leased vehicle even though that buyer had never considered doing so prior to seeing the results of the results page 36.

In one arrangement, as is shown, results page 36 shows a column of the most pertinent results for each of the standard listing tab 100, the auction block tab 200 and the lease or lease swap tab 300. Each of these columns present snapshots of the most pertinent results, such as a cover picture 38, a structured title 40 including year, model, etc., brief description 42, price 44, and location 46. Additional columns or categories of information are also contemplated.

From this results page 36 the user has the freedom to navigate back to the homepage, conduct a further search using the quick search box 24, conduct a detailed search using the search criteria box 27 by entering or selecting specific categories 28, navigate to any one of the standard listing tab 100, the auction block tab 200, or the lease or lease swap tab 300 to see additional offerings which fall into that category of information. Alternatively, the user can navigate directly to a specific vehicle by selecting a specific vehicle ad 30 presented in any of the columns 100, 200, 300 for further review of that vehicle (as will be described further herein).

In one arrangement, the search criteria box 27 is presented on each of the home page 22, the results page 36, the standard listing tab 100, the auction block tab 200, the lease or lease swap tab 300, and any other page associated with the system 10. This can include narrowing (or broadening) the search by: keyword, location, distance, vehicles for sale, vehicles on the auction block, lease swap vehicles, vehicles for lease, new, used, certified pre-owned, dealer listings, private seller, model, price, year, mileage, etc.

Selecting a Tab:

When the user is interested in reviewing the results of any one of the tabs (Standard Listing Tab 100, Auction Block Tab 200, or Lease or Lease Swap Tab 300), the user selects that tab. Again, for the purposes of this disclosure, the term "tab" is defined broadly and includes a visual display of information, as well as an interactive link which when clicked upon takes the user to a new display. The user can easily navigate from tab to tab within the website 20. Accordingly, for purposes of this disclosure, the term "tab" may also be used synonymously with the common usage of the term "webpage".

Figure 4:
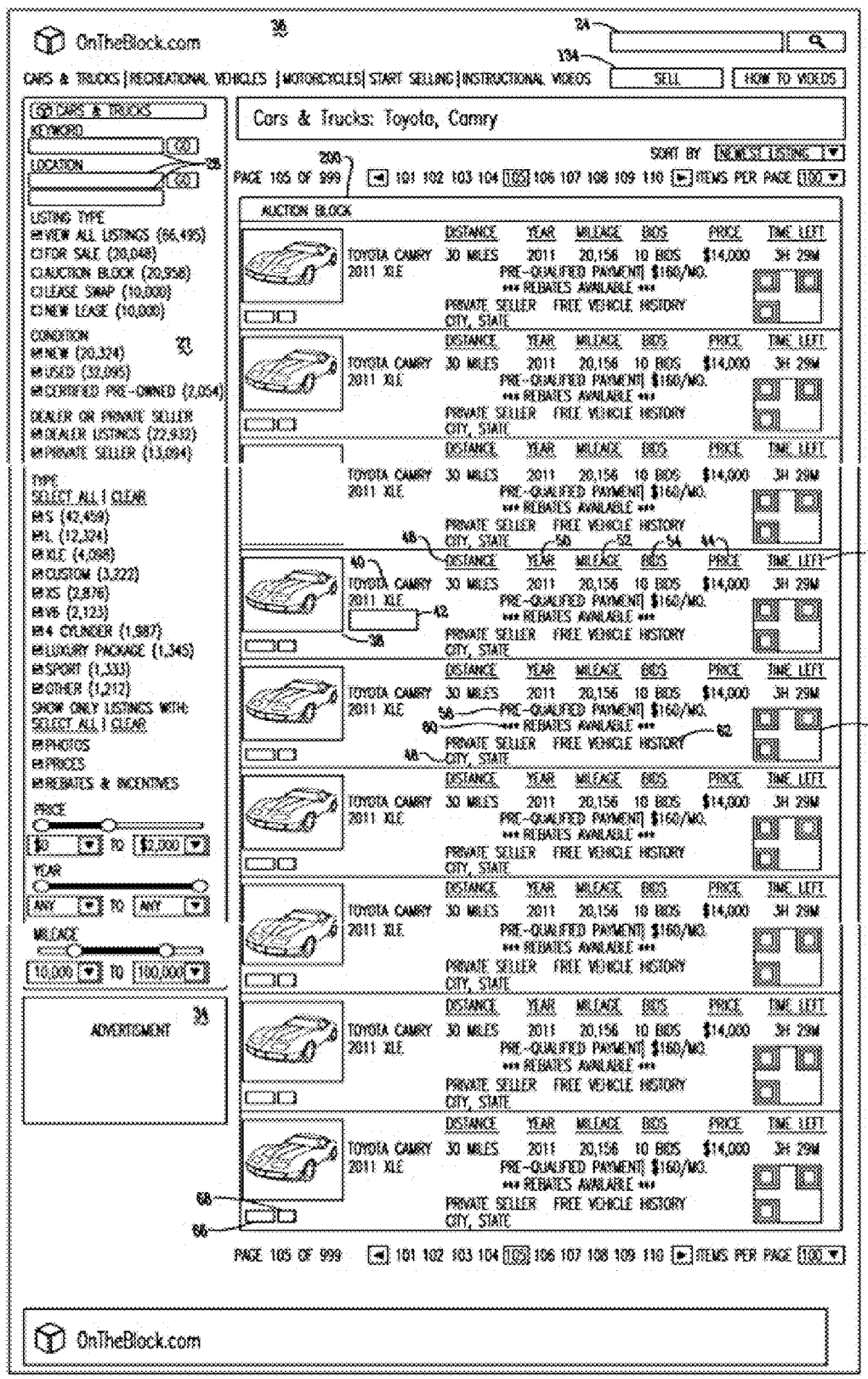
FIG. 4 is a plan view of the auction block tab of the system.

When the user selects one of the tabs (Standard Listing Tab 100, Auction Block Tab 200, or Lease or Lease Swap Tab 300) the user is presented with a slightly more detailed view of the vehicles which fall only into that category of vehicles. With reference to FIG. 4, as one example, the Auction Block Tab 300 is shown. The arrangement of the Standard Listing Tab 100 and Lease or Lease Swap Tabs 300 is similar and therefore not shown to eliminate redundancies.

The results are presented in a single column; however additional columns are hereby contemplated for use. These results include all the information shown in the individual vehicle ads 31 including the cover photo 38, title 40, description 42, price 44 and location 46. These results also show additional information not presented in the vehicle ads 31 including: distance 48 from the user's entered location, year 50, mileage 52, bids 54, time left 56 on the auction, estimated payments 58 for prequalified buyers, availability of rebates 60, a vehicle history report 62, a Quick-Response Code ("QR Code" 64) for the vehicle as well a photo link 66 and video link 68, among other information. Again, this view is that of the Auction Block 200, other or different information may be included for the For Sale Tab 100, the Lease or Lease Swap Tab 300, or any other tab.

Selecting a Vehicle for Review:

When the user clicks on any of the vehicle ads 31 shown on the homepage 22, the results page 36 or the detailed view of each of the tabs (100, 200, 300), the user is taken to a dedicated page for that vehicle. Examples of dedicated vehicle pages are shown for each of the Standard Listing Tab 100 (FIG. 5), the Auction Block tab 200 (FIG. 6) and the Lease or Lease Swap Tab 300 (FIG. 7). These detailed views include all of the information contained in the more condensed snap-shot views shown in the vehicle ads 31 displayed on the Homepage 22, the results page 36, and the tabs themselves 100, 200, 300, as well as additional information.

Figure 5:
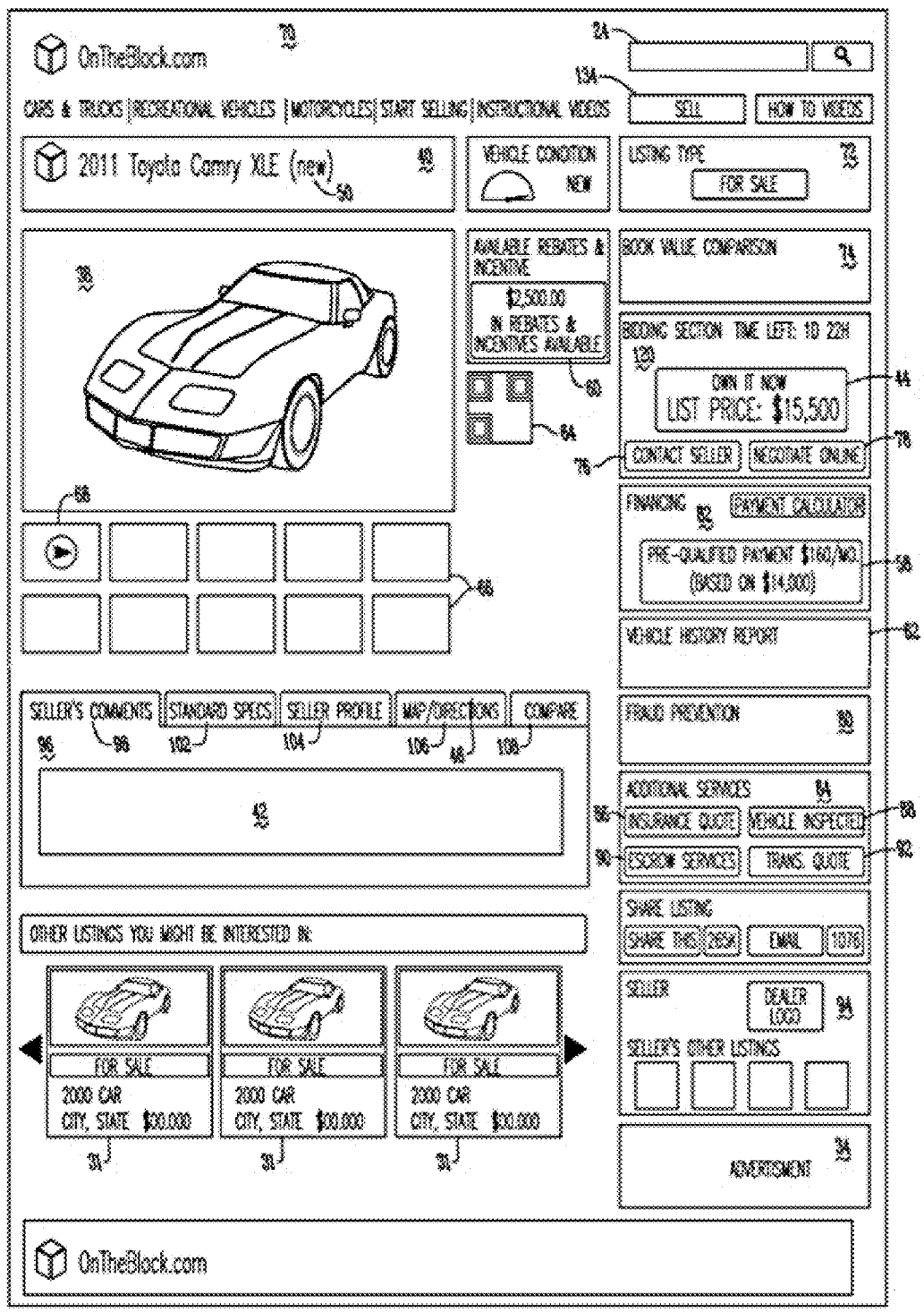
FIG. 5 is a plan view of a detailed view of a vehicle listed for sale.

With reference to FIG. 5, a detailed view 70 is presented of a for-sale vehicle listed under the standard listing tab 100. This detailed view 70 includes all of the information included in prior views of the vehicle as well as additional information, or expanded information. That is, the detailed view includes the cover picture 38 of the vehicle prominently displayed above a video link 68 and a plurality of additional photo links 66. The detailed view 70 includes or may include the title 40, description 42 (under seller's comments) the year 50, the price 44, the estimated payments 58, available rebates 60, a link to a vehicle history report 62, and a QR Code 64 for the vehicle. In addition, the detailed view 70 includes listing type section 72, which in this case shows the listing is a For Sale listing.

A standardized valuation section 74 is presented that shows a standardized valuation from a reputable organization that issues estimated vehicle values, in this particular case a NADA retail price is presented. However other providers of this information are hereby contemplated for use. A user can click on this link to further investigate the information provided by the organization regarding this vehicle. Also presented in association with the standardized valuation is the auction ceiling price, which will be further described herein, for the user's comparison purposes. This information is used by the system 10 to calculate an estimated vehicle value, as is further described herein.

A contact the seller button 76 as well as a negotiate on line button 78 are presented. These buttons are used to contact the seller directly to ask question, make counter offers, and the like.

A fraud prevention button 80 is also presented. One major obstacle to purchasing expensive products on line, especially unique products such as vehicles, is the potential for fraud, and the potential to end up with a product that does not meet the user's expectations. The fraud prevention button 80 presents the user with a portfolio of services that can help prevent fraud and ensure that the vehicle meets the expectations of the user. These services include a full detailed vehicle history report and title report, a vehicle inspection from a certified inspector, an escrow service which serves as an intermediary for the funds, as well as other services. These services can be purchased as a package, for one low price, for cost savings, or alternatively they can be purchased individually, through the system 10 without having to interface with any other company or person. When this button is clicked upon the user is presented with additional information regarding these services. In the event the user wants a vehicle history report, the system 10 arranges for one to be provided. In the event the user wants the vehicle to be inspected, the system 10 arranges for a certified inspector to inspect the vehicle and provide a comprehensive report to the user. In one arrangement, the vehicle history report is provided automatically and without cost for vehicles listed on the auction block tab 200 whereas users must purchase the vehicle history report for vehicles listed on the standard listing tab 100 and the lease or lease swap tab 300. In the event the user wants to use escrow services for the purchase, the system arranges for a third party escrow agent to handle the transaction. The presentation of these services in a single place provides assurance that the providers of these services are reputable, and also streamlines the purchasing process.

Similarly, a financing button 82 is also presented. One major obstacle to purchasing expensive products on line, especially unique products such as vehicles, is the need for financing. The financing button 82 presents the user with a portfolio of services that can help the user determine various payment options. This includes presenting the user with a payment calculator. This also includes presenting the user with an estimated monthly payment. When this button is clicked, the user is presented with various financing options from third party financiers, such as banks. By presenting this information in association with the vehicle information, this streamlines the financing process, ensures that the user gets the best and most appropriate financing for the vehicle, and ensures that the user is able to secure financing before an offer is made or the purchase is consummated. This also provides both the buyer and the seller with assurances that when an offer is made, payment will follow.

An additional services button 84 is also presented. The additional services button 84 provides or links the user to various additional services that are related specifically to the vehicle. Within this button 84 are links for insurance quotes 86, vehicle inspection 88, escrow services 90, transportation quotes 92, among others. The insurance quotes button 86 links the user to a plurality of reputable insurance companies and presents insurance quotes specific to the vehicle. The vehicle inspection button 88 links the user to reputable certified inspectors to arrange for an inspection of the vehicle. The escrow services button 90 links the user to a plurality of escrow services available for utilization for the purchase of the vehicle. The transportation quote button 92 links the user to a plurality of reputable and certified transporters for the transportation of the vehicle from its current location to the user's desired location. Again, by providing all of these services in a single location, this allows the user to better understand the cost of ownership and provides assurance to both the buyer and seller.

Also presented is a seller profile button 94. The seller profile button 94 provides additional information about the seller. This includes listing their personal information, such as name and location. As well as listing whether they are a personal seller or a dealer, and listing current and previous vehicles they have sold through the system 10. This also includes a list of reviews of the seller provided by other users of the system 10 that have transacted business with the seller.

A plurality of informational tabs 96 are also presented under the photo and video links 66, 68. These links include an expanded seller's comments section 98, a standard specs section 102, a seller profile section 104, map and directions section 106 and a compare section 108, that compares the vehicle to other vehicles sold or listed with the system 10 as well as with standardized prices for the vehicle.

Also presented is a vehicle condition gauge 110. The vehicle condition gauge 110 is a visual representation of the condition of the vehicle. In one arrangement, the vehicle condition gauge 110 is a needle that moves between 0 and 4 based on a calculated numerical value generated from results of the condition report, wherein 0 represents poor condition, and 4 represents perfect condition.

Also presented below the informational tabs section 96 are a plurality of vehicle ads 31 of similar vehicles for the quick review and comparison by the user.

Figure 6:
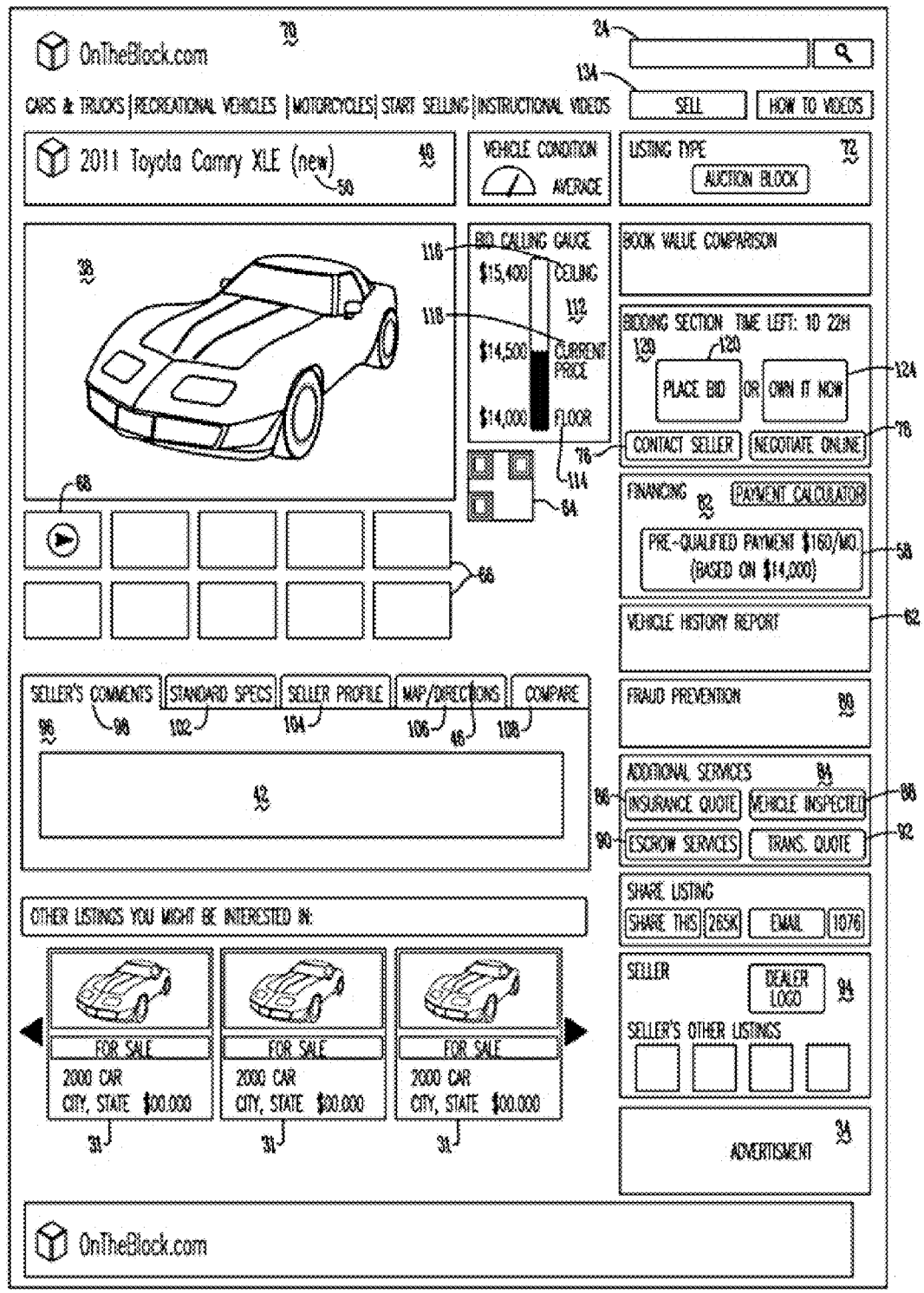
FIG. 6 is a plan view of a detailed view of a vehicle listed for auction.
Figure 7:
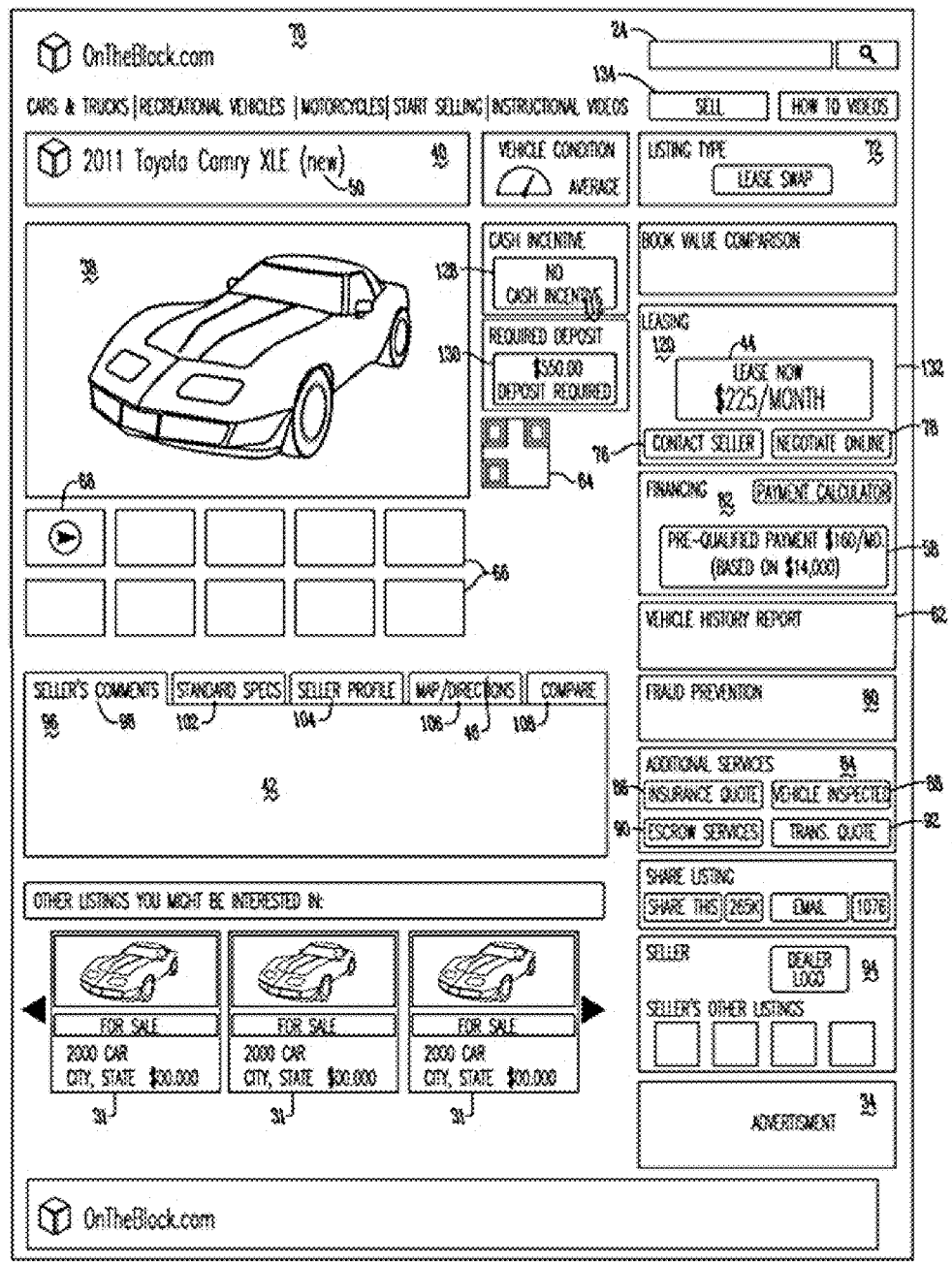
FIG. 7 is a plan view of a detailed view of a vehicle listed for lease swap.
Figure 8:
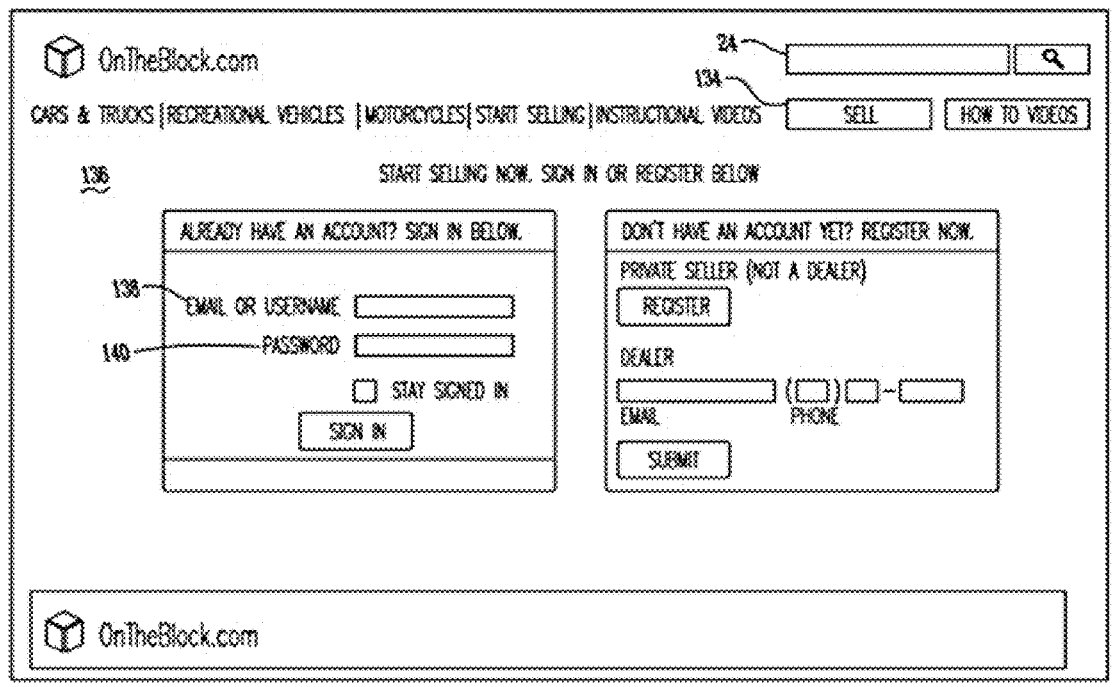
FIG. 8 is a plan view of the registration page of the system.
Figure 9:
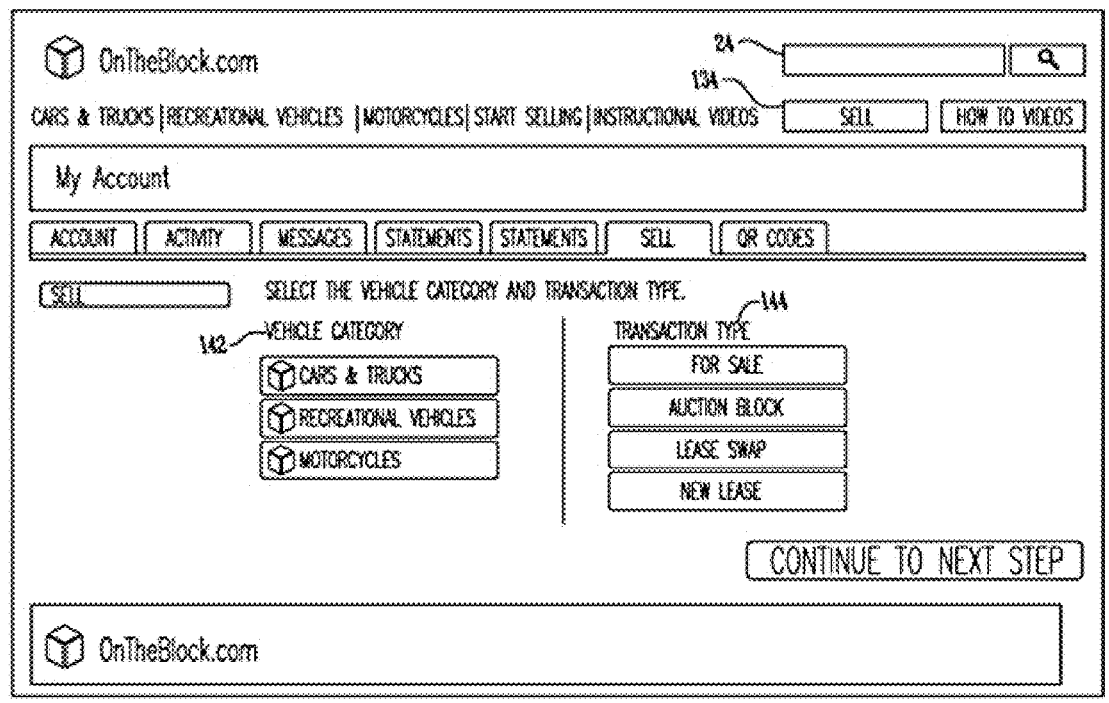
FIG. 9 is a plan view of the vehicle category selection page of the system.
Figure 13:
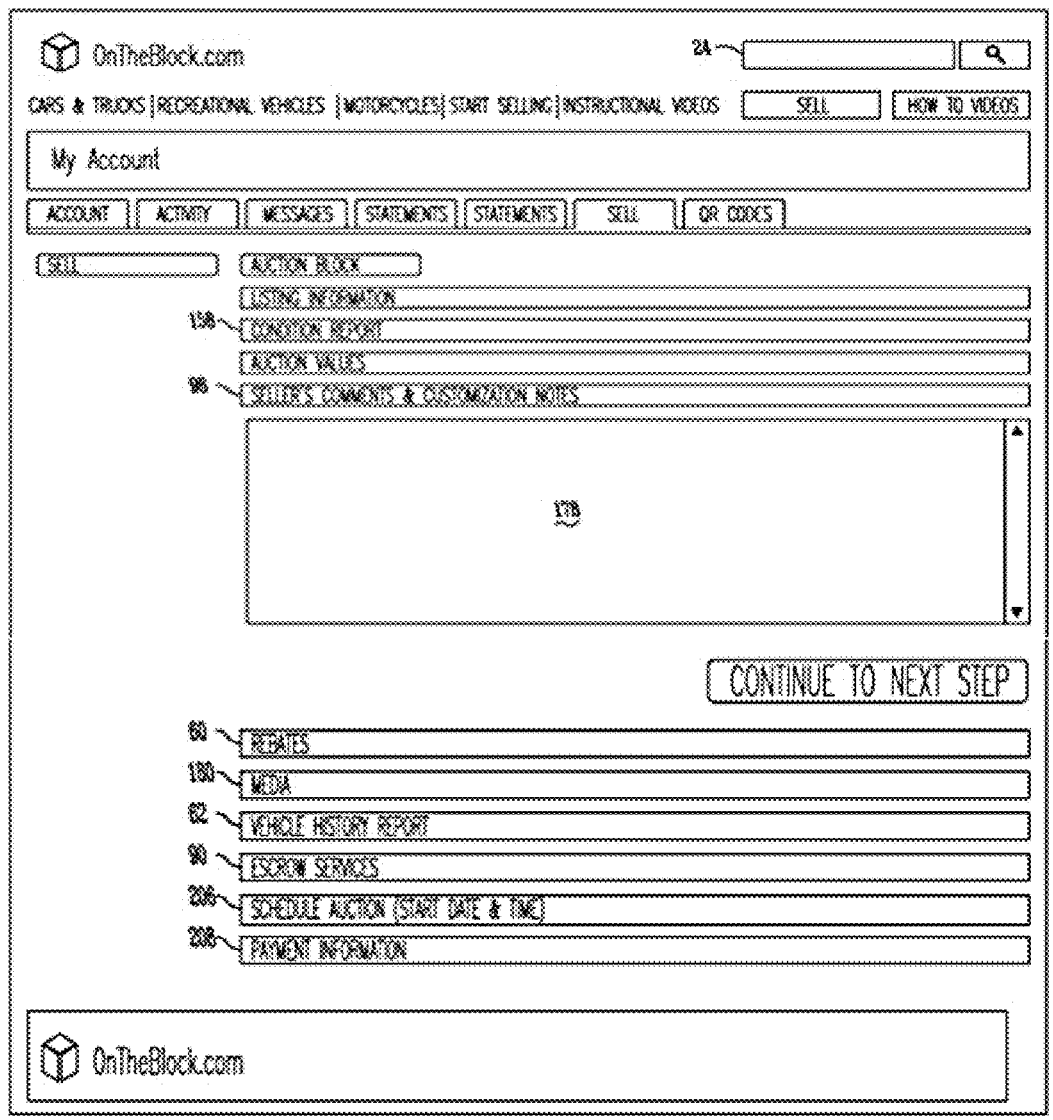
FIG. 13 is a plan view of the seller's comments page of the system.
Figure 14:
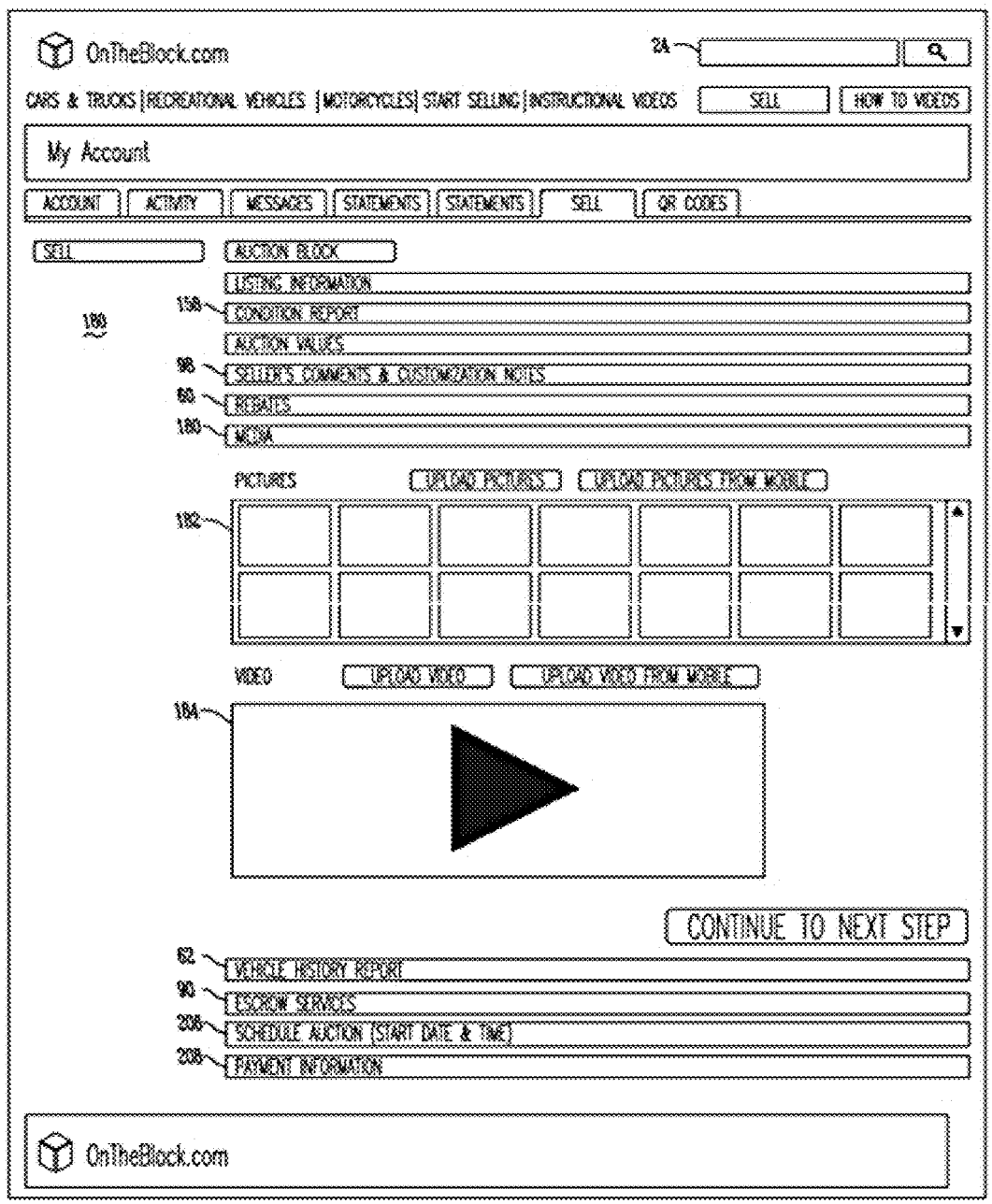
FIG. 14 is a plan view of a media page of the system.
Figure 15:
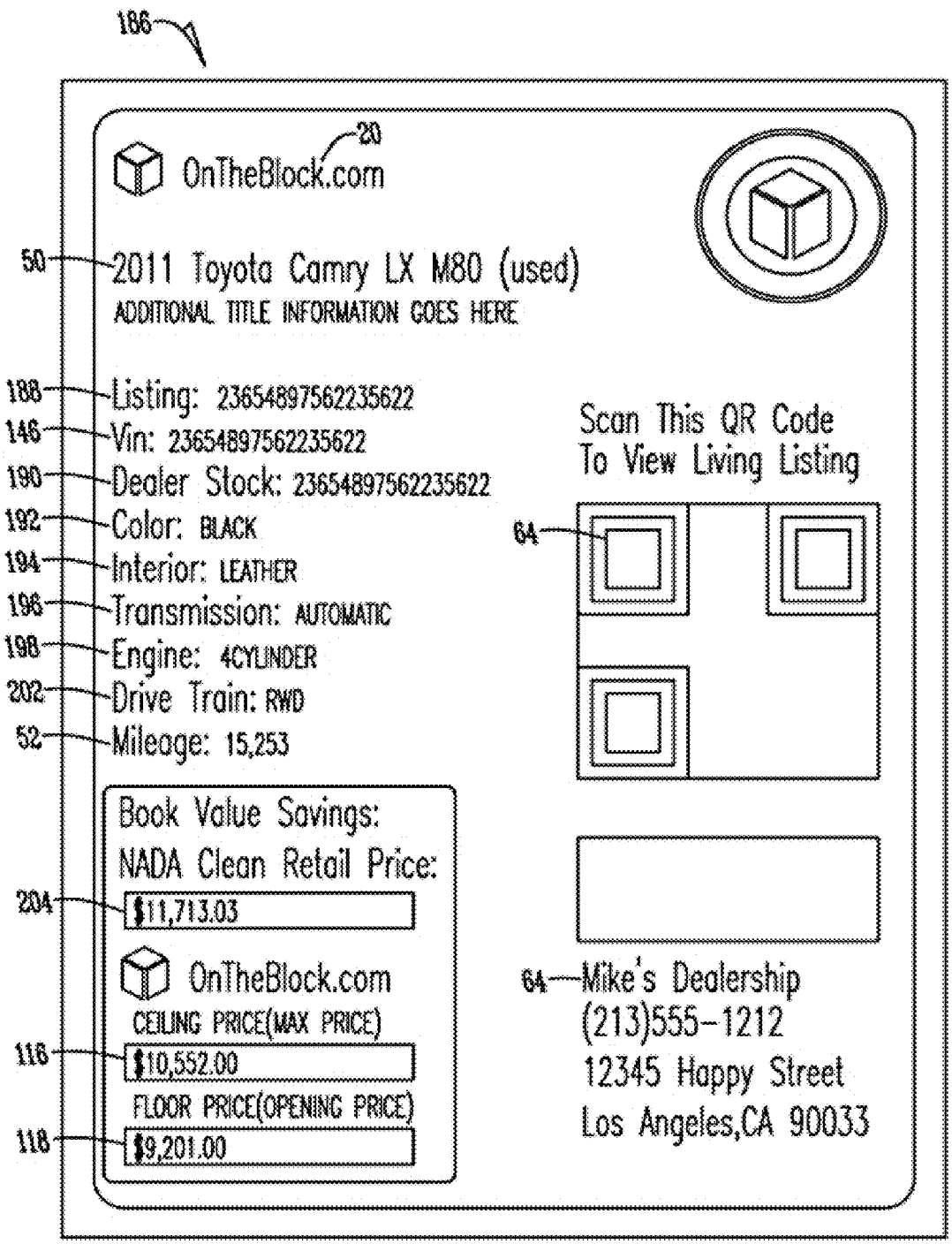
FIG. 15 is a plan view of a window sticker of the system including a QR Code, an estimated vehicle value (provided by NADA), auction ceiling price, auction floor price, and other vehicle information.

With reference to FIG. 6 a detailed view 70 is presented of an auctioned vehicle listed under the auction block tab 200. This detailed view 70 includes all of the information and tabs described herein with respect to the detailed view 70 of a vehicle for sale (FIG. 5).

In addition, the detailed view 70 of an auctioned vehicle includes a bid calling gauge 112. The bid calling gauge 112 is a graphical representation of the current bidding for the vehicle on the auction block. While any graphical representation will suffice, and are hereby contemplated, a vertically oriented temperature-like gauge is presented with a floor price 114 representing the lowest value of the gauge, a ceiling price 116 representing the highest value of the gauge, and a current price 118 representing the most current bid for the vehicle. The bid calling gauge 112 also shows numerical values as for the floor price 114, current price 118 and ceiling price 116. In addition, the bid calling gauge 112 is also shaded up to the current price 116 to visually show the bidding that has occurred.

Presented adjacent the bid calling gauge 112 is the bidding section 120. The bidding section 120 includes a place bid button 122, which the user can select to place a bid on the vehicle. In addition, the bidding section 120 includes an Own It Now button 124, which immediately closes the auction for the bidder at the ceiling price. Also presented within the bidding section 120 are a contact seller button 76 and a condition report button 126, which links to the automatically generated condition report. Also presented is the amount of time remaining on the auction.

The other components of this page are similar, if not identical to those described herein with respect to the for sale vehicle (FIG. 5).

With reference to FIG. 7 a detailed view 70 is presented of an lease or lease swap vehicle under the lease or lease swap tab 300. This detailed view 70 includes all of the information and tabs described herein with respect to the detailed view 70 of a vehicle for sale (FIG. 5) and/or a vehicle on the auction block (FIG. 6).

In addition, the detailed view 70 of a leased vehicle or a lease swap vehicle includes additional information regarding the terms and/or conditions of the lease. This includes a cash incentive button 128, which shows the cash incentive the current owner is willing to offer for an assumption of the lease. Also presented is a required deposit button 130 which shows the deposit required to assume the lease.

Presented adjacent the cash incentive button 128 and the required deposit button 130 is a leasing button 132. Clicking the leasing button 132 puts the buyer into electrical communication to close the lease or lease swap. This leasing button 132 provides additional information regarding the lease, including the monthly cost for the lease, among other information.

The other components of this page are similar, if not identical to those described herein with respect to the for sale vehicle (FIG. 5) and the auction block vehicle (FIG. 6).

When Searching for a Vehicle:

The user searches for a vehicle by entering search criteria into the quick search box 24 or by entering or selecting categories 28 in the search criteria box 27. The user can select a vehicle listing directly by clicking on a vehicle ad 31 in the featured vehicle section 30. Alternatively, the user can continue to pursue the featured vehicles in the featured vehicles section 30 while continuing to narrow or broaden the categories in the search criteria box 27.

This search criteria may include, but is not limited to, the following vehicle information: keywords vehicle type, wherein the user selects from various options such as cars, trucks, antiques, equipment, airplanes, boats, motorcycles, etc.; make, which is the manufacturer of the vehicle; model; style which includes various features such as coup, hatchback, station wagon, trim type, or any other notable feature; whether the vehicle is new or used vehicle; whether the vehicle is certified; year or range of years; body style; list price or a range of prices; exterior color; transmission type, such as manual, automatic, overdrive, 5-speed, 6-speed, etc.; engine type, such as 4-cylinder, 6-cylinder, 8-cylinder, 10-cylinder, diesel, hybrid, electric, etc.; fuel type 130, such as standard, diesel, flex-fuel, etc.; mileage or a range of mileage; interior color; interior type, such as cloth or leather; doors, which includes the number of doors; and any other information. The user is also presented with a number of other features that will help narrow the search, which may include but are not limited to: driver airbag; passenger airbag; side airbags; alarm; air conditioning; rear air conditioning; cruise control; power seats; heated seats; cooled seats; rear defrost; rear wiper; tinted glass; power windows; sunroof; and any other features.

As the user enters any of the information identified above, the system 10 accesses database 16 or accesses a third party database containing vehicle information and populates the other categories with pertinent selections that are applicable based on the prior selected categories and information. In this way the search criteria continues to narrow or get more specific based on the user's prior selections. As these categories are selected, the results are populated in real-time continually offering the user the most pertinent results.

When a user finds a vehicle listing they are interested in inspecting further they select or click on the specific vehicle ad 31. This takes the user to a page dedicated to the specific vehicle (as will be described further herein). To purchase, bid or lease the vehicle displayed in a detailed view 70, the user will contact the seller directly by using contact information displayed in the standard listing.

The unique features of this system 10 present the user with a plurality of ways to obtain a vehicle, (purchasing, bidding, leasing, etc.), this provides the user with additional ways not often considered by buyers which may help the user find a better arrangement than if they only considered a single option. In addition, the system 10 allows a user to quickly analyze the entire cost of purchasing a vehicle, including common costs not contemplated by a purchaser such as transportation costs, insurance costs, financing, etc.

Selling, Auctioning or Leasing Away a Vehicle:

When disposing a vehicle, with by selling, auctioning or leasing or lease swapping a vehicle, the user selects the sell button 134. Once this link is accessed the user is presented with a registration page 136. On this registration page, a new user must establish an email or username 138 and password 140 to create an account, or alternatively login using an established username 138 and password 140. In one arrangement, a new user must establish an account including a valid e-mail address, phone number, credit card information, whether they are a dealer or a private seller, their address, among other information. This ensures that a transaction is intended, the transaction occurs, which provides assurances to both the buyer and the seller.

Once the user account is established or associated, the user selects the vehicle category 142 (cars & trucks, recreational vehicles, motorcycles) and the transaction type 144 (for sale, auction block, lease swap, new lease).

Next, the user enters all of the applicable descriptive information regarding the vehicle. This includes the VIN, or vehicle-identification-number (VIN) 146, which is used by the system 10 to retrieve information about the vehicle from database 16, mileage 148, state of registration 150, dealer stock number 152, standard specs 154 and additional features 156. Next, the seller authors the condition report 158. This is done by providing the seller's opinion of the condition of various aspects of the vehicle, as well as the seller's comments regarding these aspects. These include, or may include, paint 160, body 162, interior 164, frame 166, powertrain 168, accessories 170, fluids 172, tires 174, and keys 176, among others.

Next, the user is presented with the auction values page 178. The auction values page 178 displays the maximum floor price 114 and the maximum ceiling price 116, which are generated automatically by a proprietary formula of the system 10. These values are based on the features of the vehicle which include or may include VIN 146 (from which information is extracted, e.g. year, make, model, features, etc.), mileage 148, state of registration 150, standard specs 154, additional features 156, etc. The seller has the option to accept the maximum floor price 114 and the maximum ceiling price 116, or lower them by entering their own values. The seller cannot raise the maximum floor price 114 or the maximum ceiling price 116.

Next, the seller is presented with a seller's comments box 178. In this box, the seller enters their comments regarding the vehicle.

Next, the seller is presented with the media page 180. On the media page 180, the seller uploads photos 182 and videos 184 of the vehicle.

From this information, the system 10 generates the various vehicle listings and ads as are described herein as well as the detailed view 70. This information is searchable by the system 10 as a user enters search criteria into the search criteria box 27 and or categories 28.

Also, a window sticker 186 or flyer is automatically generated. This sticker 186 can be placed on or in the vehicle itself. The sticker 186 includes or may include the address of the website 20, the listing number 188, the VIN 146, dealer stock number 190, color 192, interior description 194, transmission 196, an estimated value of the vehicle 204, the ceiling price 116, floor price 118, a QR Code 64, the dealer's logo 206, location 64 of the vehicle, owner or dealer, among other pertinent information.

This window sticker is placed on or in the vehicle. When a potential purchaser sees this window sticker 186, the user can scan the QR Code 64, which will immediately take the user to the vehicle's detailed view 70 webpage. In addition, upon review of the window sticker 186, the user is immediately aware of the important features of the vehicle and the conditions required for purchase.

The seller can also enter, review and/or require additional information through the registration process. This includes, rebates 60, vehicle history report 62, escrow services 90. In the event the vehicle is to be auctioned, the user selects the start date and time 206 for the auction. In one arrangement, the user selects the length of time for the auction between 1 and 5 days, however any other length of time is hereby contemplated.

Once the user has completed the registration process, the user enters payment information 208 and is charged a flat fee. Once payment is received the vehicle ad goes live on the internet.

Bulk Upload for Dealers:

As an alternative arrangement to this process, a user that is a dealership may provide their entire inventory via a bulk upload, which will automatically upload the entire dealer's inventory into the website database and place all such vehicles immediately for sale under the For Sale Tab. This bulk upload feature is paid on a monthly subscription basis by the dealer. From the bulk inventory upload, the vehicle can then easily roll the vehicle over to the auction block tab 200 or the lease or lease swap tab 300.

QR Code:

When scanned, the QR Code 64 described herein, otherwise known as a scannable code, takes the user to a mobile version of the website 20 so that the vehicle profile corresponding to the particular QR code 64 is displayed as a mobile version of the website 20 on the handheld device. Through the mobile version of the website 20 as displayed on the user's handheld device, the user can immediately interact with the seller through system 10 or use any of the functions of the Website 20. Alternatively, the QR Code 64 may display the vehicle profile in a mobile application for the website 20 if one is installed on the user's handheld device instead of displaying the vehicle profile as a mobile version of the website 20. Further detail regarding the use of QR codes in online actions can be found in U.S. Provisional Patent Application Ser. No. 61/650,195 with a filing date of May 22, 2012, entitled *Scannable Code and Method of Use* (converted as PCT Patent Application No. PCT/US2013/042043 with a filing date of May 21, 2013), as well as other improvements included in U.S. Provisional Patent Application Ser. No. 61/651,673, with a filing date of May 25, 2012, entitled *System And Method For Using Scannable Codes For Electronic Payment*, (converted as PCT Patent Application No. PCT/US2013/042614 with a filing date of May 24, 2013), which are both incorporated herein by reference.

Presentation of Third Party & Historical Information:

When the vehicle profile or detailed view 70 is displayed, independent third party information is simultaneously displayed along with the vehicle profile. This third party information is displayed to allow the user to determine the value and quality of the vehicle. This third party information may include but is not limited to: recent sales of similar vehicles in the area; independent third-party industry-specific valuations such as pricing guides published by Green Book, Blue Book, MSRP, Edmunds, NADA, KBB, Galves values of the vehicle; third-party vehicle history reports; reports on the vehicle such as Consumer Reports® or the like; manufacturer specifications; similar listings of vehicles currently for sale or auction; and any other information published about the specific make, model and year of vehicle. This information includes interactive links which will allow the user to quickly access further information through the internet.

Auction Block:

When auctioning the vehicle through the auction block 200 the user does not select the price 44. Instead, when using the Auction Block Tab 200, a maximum floor price 114 and maximum ceiling price 116 are set automatically by the system 10 based upon the VIN 146 of the vehicle being sold or other information regarding the configuration and condition of the vehicle. The maximum floor price 114 and the maximum ceiling price 116 are dictated to the buyer by the system 10. That is, when the user elects to auction their vehicle, based upon the information about the vehicle, the system 10 calculates a proprietary maximum floor price 114, which is the maximum amount at which bidding on the vehicle may start. The user may select a lower floor price 114 than the maximum floor price 114, but may not select a floor price 114 higher than the maximum floor price 114 established by the system 10. If the user does not select a lower floor price 114 than the maximum floor price 114, then the floor price 114 will be the maximum floor price 114. If the user does select a lower floor price 114 than the maximum floor price 114, then the floor price 114 will be the lowered value set by the user. The system 10 will not allow a reserve price to be set, and accordingly, the floor price 114 will function as the equivalent of the reserve price in a traditional auction.

The system 10 also calculates a proprietary maximum ceiling price 116 which is the maximum price at which the vehicle may be sold under the Auction Block Tab 200. The user may select a lower ceiling price 116 than the maximum ceiling price 116, but may not select a ceiling price 116 higher than the maximum ceiling price 116 established by the system 10. If the user does not select a lower ceiling price 116 than the maximum ceiling price 116, then the ceiling price 116 will be the maximum ceiling price 116. If the user does select a lower ceiling price 116 than the maximum ceiling price 116, then the ceiling price 116 will be the lowered value set by the user. Bidding will not be allowed to start below the floor price 114; and bidding will not be allowed to exceed the ceiling price 116. Any bids made below the floor price 114 will be ineffective and will not be allowed to be made by the system 10.

The first bidder to bid at or above the ceiling price 116 will win the vehicle at the ceiling price 116. If the ceiling price 116 is never met, the highest bid at the time of the auction's close will be the winning bid.

Establishment of the maximum floor price 116 and maximum ceiling price 114 are set by the system 10 by comparing the vehicle information (including the vehicle condition report) to third party information pursuant to the proprietary formula of the system 10 and generating an estimated vehicle value. The maximum floor price 114 and maximum ceiling price 116 will be based on a proprietary formula that may take into consideration the vehicle's wholesale, trade-in, and/or retail values (estimated vehicle value). As an example, the NADA suggested retail price is one measure of the retail value of the vehicle.

In one arrangement, so as to promote sales, the maximum floor price 114 and the maximum ceiling price 116 are based on a multiplier that will result in a percent mark-up or mark-down from industry based wholesale, trade-in, or retail values (estimated vehicle value).

In one arrangement this equation includes:

Maximum Floor Price=(Wholesale, Trade-In, and/or Retail Value))*(Floor Multiplier)

Maximum Ceiling Price=(Wholesale, Trade-In, and/or Retail Value))*(Ceiling Multiplier)

In one arrangement, the Floor Multiplier is less than the Ceiling Multiplier.

As an example to show how one combination of these values may be used to dictate floor and ceiling prices, assume the trade-in value of the vehicle is $10,000.00 and the retail value is $15,300. The Floor Multiplier for this particular make, model, year may be 1.02 times the trade-in value and the Ceiling Multiplier may be 0.90 times the retail value. In this case:

The Floor Price=(10,000)(1.02)=$10,200.00

The Ceiling Price=(15,300)(0.90)=$13,770.

In this oversimplified example, any bids below $10,200.00 will be ineffective. If the final bid is between $10,200.00 and $13,770.00, exclusive, the vehicle will be transacted to the final bidder at that price. The first bidder to bid $13,770.00 or above will immediately win the vehicle at the ceiling price 116.

By setting the floor price 114 and ceiling price 116 at a multiplier to the independent third party wholesale, trade-in, and/or retail value, the auction block 200 promotes the sale of vehicles because dealers will receive more than they expect to receive at wholesale auction houses while buyers will, on average, purchase vehicles at significant discounts to average retail prices or dealership prices. This will attract both sellers who want to offload their vehicles, while simultaneously attracting buyers who are interested in buying vehicles at a discount.

In an alternative arrangement, the system 10 calculates an estimated price based on a plurality of independent third party prices. Then the discount calculations are taken from this estimated price.

In addition, while the user can select the start date and time 206 for the auction, the auction block 200 sets a time limit. Once the time has expired, the auction is closed and the vehicle is either transacted to the highest bidder if the floor price 114 has been met or exceeded or the auction closes without a sale if the floor price 114 has not been met.

To further simplify matters, in one arrangement the system sets the bid increments based on a predetermined formula or user selected criteria. That is, the bidder does not key in a price, but instead the bidder clicks a bid button which bids the next bid amount based on the next preset incremental bid amount. As an alternative arrangement, the bidder can place a proxy bid, which is the maximum amount the bidder is willing to pay. The system will then auto-bid for the bidder up to that maximum amount as it's required to bid against other bidders who are also bidding on that auction.

In one arrangement, another feature of the system 10 is to provide a tiered reward structure wherein a portion of the bid fees from any given auction listing may be returned to the seller, with a higher percentage return going to higher volume sellers. Bid fees are generated from bidders under the auction tab 200. A bid fee is charged to a bidder for each vehicle the bidder desires to bid on. Once the initial bid fee is paid by the bidder for each auction vehicle, the bidder is free to bid on that vehicle as many times as desired with no additional fee.

As an example, one tiered system could include returning 15% of bid fees to a dealer who generates up to $10,0000.00 in bid fees from that dealer's listings in a month; 25% of bid fees to a dealer who transacts $10,000.01-$20,000.00 in bid fees from that dealer's listings in a month, and 35% of bid fees to a dealer who transacts over $20,000.01 in bid fees from that dealer's listings in a month. A non-dealer auction seller may also receive a portion of the bid fees returned to them, but will likely only qualify for the lower tier based on their volume. In both situations, dealers and non-dealers, this feature will promote continued use of the Website 20 and will develop user loyalty. Further, this feature will promote a positive user experience for sellers of vehicles, which on average, is lacking in the current vehicle sales model. Accordingly, this feature is a significant improvement over the current state of the art.

The auction tab 200 may allow the seller to set desired bid increments to be used for each specific auction listing. By way of example, the auction tab 200 may allow an auction seller to choose standard bid increments of $20, $40, $60, $80 or $100. The auction seller would then choose whichever bid increment the seller believes will best suit the auction. Alternatively, the auction tab 200 may automatically set the bid increments based upon a proprietary formula established by the System 10. Alternatively, the auction tab 200 may automatically determine a set number of bid increment choices based upon a proprietary formula established by the System 10. The seller would then choose whichever bid increment the seller believes will best suit the auction from the set number of bid increment choices established by the System 10.

When Buying a Vehicle Through Auction:

After conducting a search through the homepage 22 and selecting the auction block tab 200 on the results page 36, the user may enter further search criteria to find auction vehicles which meet their search criteria. Once the vehicle information is entered all active auctions are displayed which meet the user's search criteria, in order of relevance. The categories of relevance can be selected such as price, time remaining, relatedness to search criteria or any other category.

As an alternative to the search methodology set forth above, a buyer may also search for an auction vehicle by using a text search box displayed on the home page of the Website 20.

Each auctioned vehicle profile is displayed. Pertinent to the auction, the amount of time remaining is also presented as well as the current bid 214, the floor price 116, the ceiling price 116, and any other information regarding the vehicle. In addition, as is described herein, independent third party information is simultaneously displayed along with the vehicle profile. This third party information is displayed to allow the user to determine the value and quality of the vehicle. This third party information may include: recent sales of similar vehicles in the area; certified valuations such as pricing guides published by Green Book, Blue Book, MSRP, Edmunds, NADA, KBB, Galves values of the vehicle; reports on the vehicle such as Consumer Reports® or the like, manufacturer specifications; similar listings of vehicles currently for sale or auction; and any other information published about the specific make, model and year of vehicle.

In the event the user wants to bid on the vehicle the user must associate an existing user account or establish a new account through the registration page 136. Once the user account is associated, the user can submit a bid by clicking the place bid button 122. Alternatively, to speed the process, in the event a buyer does not want to compete for the vehicle, the "Own It Now" button 124 is pressed. At the moment the buyer clicks the Own It Now button 124, a screen appears requiring buyer to confirm they intend to purchase the vehicle at the ceiling price 116, and if the bidder confirms, the bidder immediately wins the vehicle auction at the ceiling price 116. This speeds the auction and ensures that the bidder wins the desired vehicle while still at a reasonable price.

When the seller submits the vehicle for auction, and the user submits a bid, both the user and the seller are committed to the process through a binding agreement as is defined by the terms of use. Once a bid is accepted, the buyer can arrange for shipping directly from the seller or from a third party shipping service through the transportation quote button 92 displayed on the site. The buyer can also arrange for financing directly from the seller or from a third party financing service through the financing button 82 displayed on the site.

The auction tab 200 may allow automatic computerized bidding on behalf of an auction buyer up to a maximum bid amount supplied to the Website 20 by the buyer. Alternatively, the auction tab 200 may require an auction buyer to manually key in each bid.

Fees:

Fees are charged through the system 10 in the following manner. A flat fee is charged for a standard listing, either a for sale listing, an auction listing, or a lease or lease swap listing, this fee is a first amount (such as $35.00.)

A "premium marketing fee" may be charged to an auction block tab 200 seller. The success fee would represent an additional fee charged to the seller in the event the auction listing achieved the bid maximum ceiling price 116. The premium marketing fee may be a flat fee charged to all auction listings or it may be a percentage fee based on the final sales price of the auction, whereby higher priced vehicles would result in a higher premium marketing fee. The premium marketing fee would be payable by the auction seller directly to the website 20. In one arrangement, the premium marketing fee is a second amount (such as $99.00).

One barrier to entry preventing a seller from putting a vehicle up for auction is the hesitation to turn away an in-person buyer during an auction. In the event that an in-person buyer wants to purchase the vehicle during an auction, and the seller wants to sell them the vehicle, "remove listing" fee is charged to the seller to terminate the auction. This remove listing fee is a flat fee. This fee is a third amount (such as $199.00).

In one arrangement, a buyer is free to submit as many bids as they want without any fees being charged to them until they win a bid. Once a buyer wins a bid, they are charged a flat document processing fee for winning the auction. In one arrangement, this fee is a fourth amount (such as $99.00).

To ensure that payment occurs for these fees, both buyers and sellers are required to associate an active credit card with their user accounts. These fees are automatically charged to their credit card.

While some fees are charged through the system to the buyer and the seller, in one arrangement the transaction is arranged between the buyer and the seller directly. Alternatively, the buyer and/or the seller arrange for a third party, such as a financing institution, such as one found under the financing button 82 or the escrow button 90, to effectuate the transaction.

Concierge Service:

Even though the Website 20 significantly improves the process of purchasing a vehicle, some users will still prefer to have a third party purchase vehicles for them. This may be due to several factors including but not limited to language or cultural barriers, a preference to save time, or a preference to avoid any bidding or negotiation process altogether.

Accordingly, in the event that a user would like to have a buyer purchase a specific vehicle for the buyer, the buyer accesses a concierge service tab 400 (not shown to avoid redundancies but described herein and similar to the previous tabs 100, 200, 300 as are shown and described herein). To do so, the user must associate a user account by logging in. Once logged in, the user develops a vehicle profile by selecting vehicle information, as is described above, which describes the vehicle they are looking for. In addition, the user identifies the price at which they would be willing to purchase this vehicle and the time frame for which the order can be filled.

Once the user submits this information, their credit card is charged a concierge fee, such as a flat fee. A third party acting as a concierge then searches for a vehicle for the buyer which meets the buyer's criteria. When the third party concierge finds a suitable vehicle, the concierge initiates the bidding or negotiation process. The concierge then either completes the purchase for the buyer or submits a reimbursement request to the buyer, or the concierge obtains payment from the buyer to close the transaction with the seller of the vehicle located by the concierge.

In the event that the concierge request is not filled within the specified amount of time, a portion of the concierge fee may be returned to the buyer.

Figure 3:
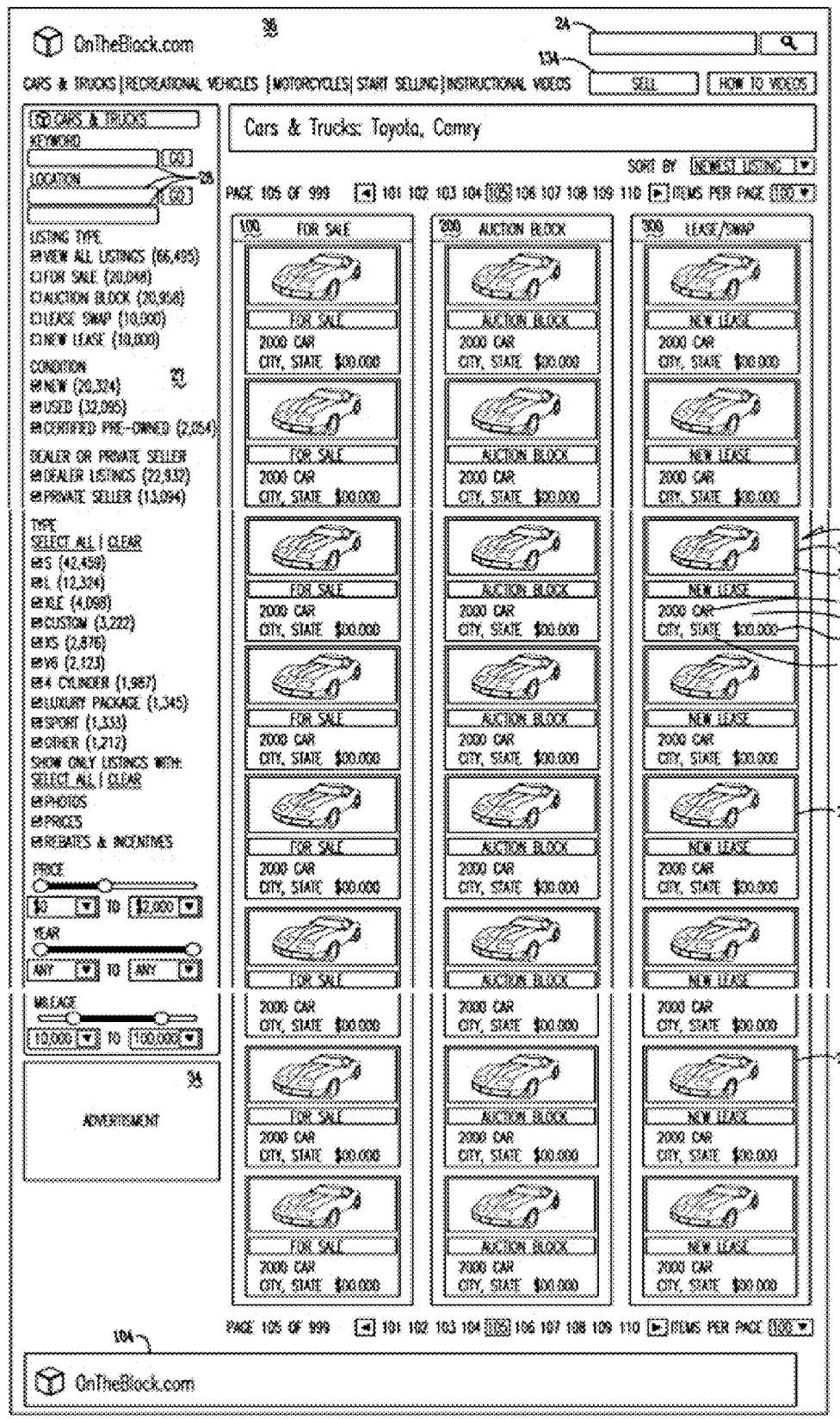
FIG. 3 is a plan view of the results page of the system showing the standard listing tab, the auction block tab and the lease or lease swap tab.

Lease and Lease Swap:

Vehicles for lease are listed in the manner described herein under the lease or lease swap tab 300 and with reference to FIGS. 3 and 7.

Swapping Out of a Lease:

In the event that a user has a leased vehicle that they want to get out of prior to the original termination of the lease, the user establishes an account using the registration page 136, and selects new lease or lease swap transaction type 144. Next, the user develops a vehicle profile by selecting vehicle information. Specifically to the lease swap system 300, the user enters the monthly payment terms, the remaining mileage left on the lease, the terms of the swap, and any other pertinent information.

The advantage to a user swapping out of a lease is that the user may get out of an existing lease prior to its original expiration, thereby freeing up the user to lease or purchase a new vehicle. Alternatively, users stuck in leases may need to swap out of a lease in order to reduce their monthly expenses, and a lease swap may allow them to do so without a fine or penalty.

The lease or lease swap tab 300 also allows the user to define floor and ceiling limits for what the user will offer as incentives to the lease assignee. The website 20 may then automate replies to potential assignees who intend to make best offers to the user.

As an alternative, the lease swap tab 300 may also allow the user an option to conduct an auction type listing (as described herein), whereby the user would start the auction at on opening bid equal to the maximum cash incentive he or she is willing to offer to a lease assignee. Additional bids would then reduce the incentive amount by set bid increments. The winning bidder would then be the bid representing the lowest incentive amount. Incentives include, or may include, lump sum payments and/or reduced monthly payments.

By way of example only, a user may list a vehicle for auction under the lease swap tab 300. The user may open bidding at $3,000, representing the maximum cash incentive dollar amount that user is willing to offer a potential lease assignee. If bid increments were set at $20, the next bidder would need to bid $2,980 in order to be the highest current bidder. Bidding would continue until the auction ended.

Swapping into a Lease:

In the event that a user wants to swap into a leased vehicle, the user selects vehicle information to describe the vehicle they are looking for and selects the lease or lease swap tab 300, which presents all vehicles which meet the search criteria.

In the event the user wants to submit a bid or make an offer on any of the lease vehicles, the user must log into the system and associates a user account. Once logged in, the user can submit a lease offer or bid through the leasing button 132. This offer is then transmitted to the seller, who can accept or deny the offer.

The advantage to a user swapping into a lease is that the user can often assume a lease for significantly less fees than the user would encounter in a new lease. Additionally, the user will typically have a shorter remaining lease commitment than would otherwise be found in a new lease.

Trade in Tab:

When a user has a vehicle that they want to offload in a short period of time, perhaps so as to have the funds to purchase a new vehicle listed on the Website 20 or elsewhere, the user selects the trade in tab 500 (not shown to avoid redundancies but described herein and similar to the previous tabs 100, 200, 300 as are shown and described herein). The user develops a vehicle profile by selecting vehicle information. Once the vehicle profile is developed, the user submits the trade in request. Once the submit button is selected the trade in request is submitted to a network of associated and certified dealers who are certified to handle trade in requests. Once the dealers receive the trade in request they evaluate the trade in and issue a trade in offer which is submitted through the system 10 to the seller who can accept or deny the offer.

As an alternative to submitting a trade in offer to a network of dealers, a user may submit a trade in offer directly to one preferred dealer in the event that the user desires to purchase a car from that dealer, in an effort to avoid transactions with two different dealers and to simplify the overall transaction by purchasing one vehicle and trading in another vehicle with the same dealer.

Enthusiast Tab:

An enthusiast tab 600 (not shown to avoid redundancies but described herein and similar to the previous tabs 100, 200, 300 as are shown and described herein) provides users a platform to post information and photographs about their vehicles online for the purpose of displaying information to the public about their vehicles. The enthusiast tab 600 allows users the ability to quickly create profile page for their vehicle that anyone can view. One common user of the enthusiast tab 600 will be the vehicle enthusiast who likes to modify their vehicle with certain aftermarket or dealer certified parts, thereby changing the appearance, function, or performance of their vehicle. An enthusiast profile will allow such user to display all information about their modifications as well as multiple pictures. Another common user of the enthusiast tab 600 may be vehicle collectors or owners of classic vehicles who wish to display information about their vehicle collections or classic vehicles.

A profile built in the enthusiast tab 600 can easily be converted to a standard listing, auction block listing, a lease or lease swap listing, a trade in listing or the like, in the event the user decides to sell or swap out of a lease for their vehicle. The integration of the enthusiast tab 600 with the other services from the website 20 makes this process streamlined and easier than using any other online vehicle sales website or any traditional in person sales method, and as a result, is a significant improvement of the current state of the art.

Additional Features:

One feature of this system 10 is the ability for buyers and sellers to comment on and provide satisfaction rankings on other buyers and sellers. In the event that a buyer had a great experience with a seller, the buyer can add a good rating to the seller's profile 94. When other buyers see this ranking it provides a level of security to conducting business with this seller. In the event the buyer had a bad experience with the seller, the buyer can add a bad rating to the seller's profile. This will provide the next buyer with an added level of caution when transacting business with this seller.

A transportation feature 92 is available for all vehicle sales, wherein users may obtain quotes for transportation services from third party service providers.

The website 20 may also provide a bill of sale document service to any standard listing or auction block listing. This will facilitate the closing of the transaction and the transfer of title from seller to buyer in a quicker, more efficient and more secure manner. These forms are specifically tailored to the state(s) involved in the transaction to ensure that state-specific required documentation is properly completed for the transaction.

In another arrangement, the system 10 described herein, and the system of setting the floor and ceiling prices for an auctioned vehicle, is used to auction vehicles in person, with or without the use of the internet.

Simultaneous Presentation of Bid Calling Webpage on Vehicle Dealer Website and Auction House Website:

As one example, the system and method of auctioning a vehicle 700 through the internet can be accomplished by accessing a bid calling webpage 702 through either a vehicle dealer website 704 or through an auction house website 706 which may contain cosmetic variances between them but which are both synced to the same Auction Listing Database 703 and include the same information and content.

Most vehicle dealers 708 who have a large number of vehicles for sale have their own website 704 where they list the vehicles 700 they have for sale. Many of these vehicle dealers 708 allocate a tremendous amount of money, energy and effort towards their websites 704. Many of these vehicle dealers 708 actively promote their websites 704 through various advertising channels and do what they can to drive as much internet traffic through their websites 704. As such, many of these vehicle dealer websites 704 have developed a tremendous amount of internet traffic.

These vehicle dealers 708 often update their websites 704 with the vehicles 700 they have for sale and provide detailed information about each vehicle 700, such as its make, model, mileage and condition as well as positing various pictures, or even videos, of the vehicle. The vehicle dealers 708 do this because they believe that it improves their sales, brings new customers into their dealership, provides valuable information to the vehicle dealer's potential customers, and reduces the amount of time that a vehicle dealer's sales people must spend with each customer.

While these vehicle dealer websites 704 are certainly helpful in the ways described above, these Vehicle Dealer Websites 704 amount to nothing more than an online classified advertisement akin to the Standard Listing Tab 100. Most vehicle dealer websites 704 do not possess the ability to post a vehicle auction through their own vehicle dealer website 704. Further, no vehicle dealer 708 has the ability to sync an auction listing posted on the vehicle dealer website 704 with an auction listing posted on an auction house website 706 to, through or using the same auction listing database 703.

An auction house 710 is define herein as any entity which regularly conducts any type of vehicle auctions, whether online, in person, or any combination of both. An auction house 710, as is described herein has its own auction website 706. The auction house 710 promotes this auction house website 706 through various advertising channels and has its own internet following. As vehicle dealers 708 have a somewhat geographically centered business, their internet traffic tends to be more local in nature; whereas the auction house 710 tends to have internet traffic that is more expansive and less geographically centered. Said another way, the audience base or customer demographics of the auction house 710 and the vehicle dealer 708 tend to differ.

In addition, while auctioning a vehicle 700 may be a rare or intermittent occurrence for any one vehicle dealer 708, for an auction house 710 this is a common, even constant occurrence, and auction house 710 typically auctions multiple vehicles 700 at any one time and has more vehicles 700 at auction, which provides a buyer 712 with comparable sales for review, as well as assurance that any auction is safe and will be carried out pursuant to the buyer's expectations. In addition, an auction house 710 is directed towards auctioning multiple vehicles 700 at any one time has more buyers 712 that are willing or prepared to bid on a vehicle 700. Furthermore, an auction house's business is self-reinforcing, that is, the more buyers there are, the more sellers there are, which leads to more buyers, which leads to more sellers, and so on.

As such, forming a partnership or a business relationship between a vehicle dealer 708 and an auction house 710 is beneficial to both parties. That is, the vehicle dealer 708 provides vehicles 700 for auction whereas the auction house 710 provides its auction house website 706, process, procedure and know-how and its internet traffic and customer base to auction the vehicle 700. In this way, both the vehicle dealer 708 and the auction house 710 benefits. The vehicle dealer 708 gets to sell its vehicle 700 and the auction house 710 gets to auction the vehicle 700.

With reference to FIGS. 16-22, a system is presented wherein a vehicle 700 is auctioned through one or more cosmetically different bid calling webpages 702, which all sync to the same auction listing database 703. In one arrangement, one bid calling webpage 702 is contained within, supported by, or part of the vehicle dealer website 704 while another bid calling webpage 702 is contained within, supported by, or part of the auction house website 706. Each bid calling website 702 will sync dynamically and in real time to the same auction listing database 703. While a third bid calling webpage 702 may be contained within a stand-alone co-branded website.

Example of Bid Calling Webpage:

Many ways of presenting a bid calling webpage 702 exist. As one example the bid calling webpage 702 presents all the features described herein related to the auction block 200 and/or standard listing tab 100. That is, the bid calling webpage 702 presents the floor price 114, the ceiling price 116, and the current price 118 for the vehicle 700. These prices are initially set by the auction house 710, and while they cannot be raised by the seller/vehicle dealer 708 they can be lowered by the seller/vehicle dealer 708.

As is shown, the bid calling webpage 702 presents all information about the vehicle 700 as is described herein. That is photographs 182 of the vehicle 700, videos 184 of the vehicle 700, a vehicle description 154, which includes important information about the vehicle 700. The bid calling webpage 702 also presents a seller's comments portion 716 wherein the seller can provide valuable insight into the vehicle 700 that only the seller themselves would know. This provides the seller with an opportunity to highlight the benefits, condition, and features of vehicle 700. The bid calling webpage 702 also presents a seller profile portion 718 wherein the seller can provide valuable information about the seller themselves. The bid calling webpage 702 also presents a map & directions portion 720 wherein a seller can provide information about the location or locations of the seller and/or the vehicle itself. The bid calling webpage 702 also presents a compare portion 722 wherein information about comparable sales is presented to the user to help them understand the value of vehicle 700, what similar vehicles sold for recently, the estimated value of the vehicle through various channels (i.e. blue book, NADA, etc.), and other comparable information.

The bid calling webpage 702 also provides an other options portion 724 where other vehicles are offered through the auction house 710. In one arrangement, the vehicles 700 displayed in the other options portion 724 are limited to those offered by the same seller/vehicle dealer 708 through auction house 710. In another arrangement, the vehicles 700 displayed in the other options portion 724 are offered by any other seller through auction house 710 and may be limited by any other criteria such as make and model, distance to buyer, price range, etc.

The bid calling webpage 702 presents a bid calling gauge 726, which provides a user friendly visual illustration of the floor price 114 and the ceiling price 116 and the current price or current bid 118 for the vehicle 700. Adjacent the bid calling gauge 726 is a place bid button 122 as well as an own it now button 124. When the place bid button 122 is clicked the buyer can bid any amount between the higher of the floor price 114 or current price 118, and the ceiling price 116.

The bid calling webpage 702 also presents a contact seller button 728, which when clicked puts the buyer into contact with the seller through electronic communication such as e-mail, text messaging, phone, video conferencing or the like. Also, the bid calling webpage 702 presents a condition report button 730 which when clicked provides the buyer with a seller-generated condition report.

The bid calling webpage 702 also presents a financing portion 732, which when clicked upon presents the buyer with a plurality financing options, such as putting the buyer into contact with various financing providers, including seller financing, banks, banking institutions, credit unions, and the like. This financing portion 732 also includes a payment calculator, as well as an interactive, real-time prequalified payment button 734, which presents a predetermined monthly payment based on the current price 118 of the vehicle 700 and the lowest priced financing option, or a preferred financing option. As the current price of the vehicle 700 changes, the monthly payment displayed on the prequalified payment button 734 adjusts to the new price in real-time or almost real-time.

The bid calling webpage 702 also presents a vehicle history report button 736, which provides the buyer with a vehicle history report from one or more of the following: instaVIN, Carfax, AutoCheck, and the like.

The bid calling webpage 702 also presents a fraud prevention portion 738, which provides the buyer with a plurality of services, which each provide different fraud prevention functions, including any one of the following, vehicle history reports, vehicle inspections, escrow services, insurance, and the like as are described herein.

The bid calling webpage 702 also presents an additional services portion 740, which presents the buyer with a plurality of additional services they may need or desire in association with the purchase of a vehicle. These services may include, insurance quotes 742, vehicle inspection 744, escrow services 746 and transportation quotes 748. Using the additional services portion 740 the buyer can quickly access needed information to determine whether to purchase the vehicle 700 through contact with pre-approved and reputable third party service providers. As an example, using the escrow services button 746 the buyer can get into contact with and arrange payment through an approved and reputable escrow service wherein payment is provided to the escrow service by the buyer, the vehicle 700 is then shipped to the buyer by the seller and funds are not transferred to the seller by the escrow service until after the vehicle 700 meets the buyer's approval and authorizes release of the funds. Using an escrow service provides protection and assurances for both the buyer and the seller and thereby reduces the risk of using the system 10 and promotes use of the system. Similarly, using the transportation quotes button 748 the buyer can get into contact with, get quotes for and arrange transportation of the vehicle 700 to the buyer through an approved and reputable transportation service.

As is shown, the bid calling webpage 702, in this example, provides instant access to all information a buyer could possibly need to analyze whether to purchase vehicle 700, including the full cost of purchasing that vehicle (factoring in, transportation, insurance, transaction costs, financing, etc.). This information is verifiable through independent third party providers. And all other necessary services are provided in one place to enable a buyer to buy vehicle 700. In this way, bid calling webpage 702 is convenient, quick, accessible and provides the buyer the opportunity to buy a vehicle 700 for a substantial discount.

Figure 22:
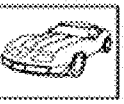
FIG. 22 is a plan view of a screen on the vehicle dealer website of a list of vehicles that are being auctioned by the vehicle dealer through the auction house, the webpage having an auction link and cobranding elements with both the vehicle dealer and the auction house.

Access to Bid Calling Webpage Through Dealer Inventory Listing:

In one arrangement, a buyer accesses the vehicle dealer website 704 of a vehicle dealer 708. From the vehicle dealer's website 708 the buyer accesses an auction link 750, which displays a list of all vehicles currently listed by the vehicle dealer 708 with the auction house 710. An example of which is shown in FIG. 22. As is shown in this example, a list of vehicles 700 is presented that are currently for sale on the auction block 200 by auction house 710. When a buyer clicks on any one of these vehicles 700, the buyer is taken to a custom bid calling page 702 for that vehicle 700, which is a custom and reformatted version of the auction house website's bid calling webpage 702, which has been embedded within the vehicle dealer website 704 and which syncs dynamically and in real time to the auction listing database 703. As a result, when accessing the custom bid calling webpage 702 from the vehicle dealer website 704 the buyer can bid on the same vehicle 700 that is simultaneously listed for sale on the bid calling webpage 702, which is located on the auction house website 706. Or alternatively, the vehicle 700 is listed as a vehicle for sale by the vehicle dealer 708 in any manner on the vehicle dealer website 704 and when the buyer clicks on the listing, the buyer is directed to the custom bid calling webpage 702 that is located on the vehicle dealer website 704.

Figure 16:
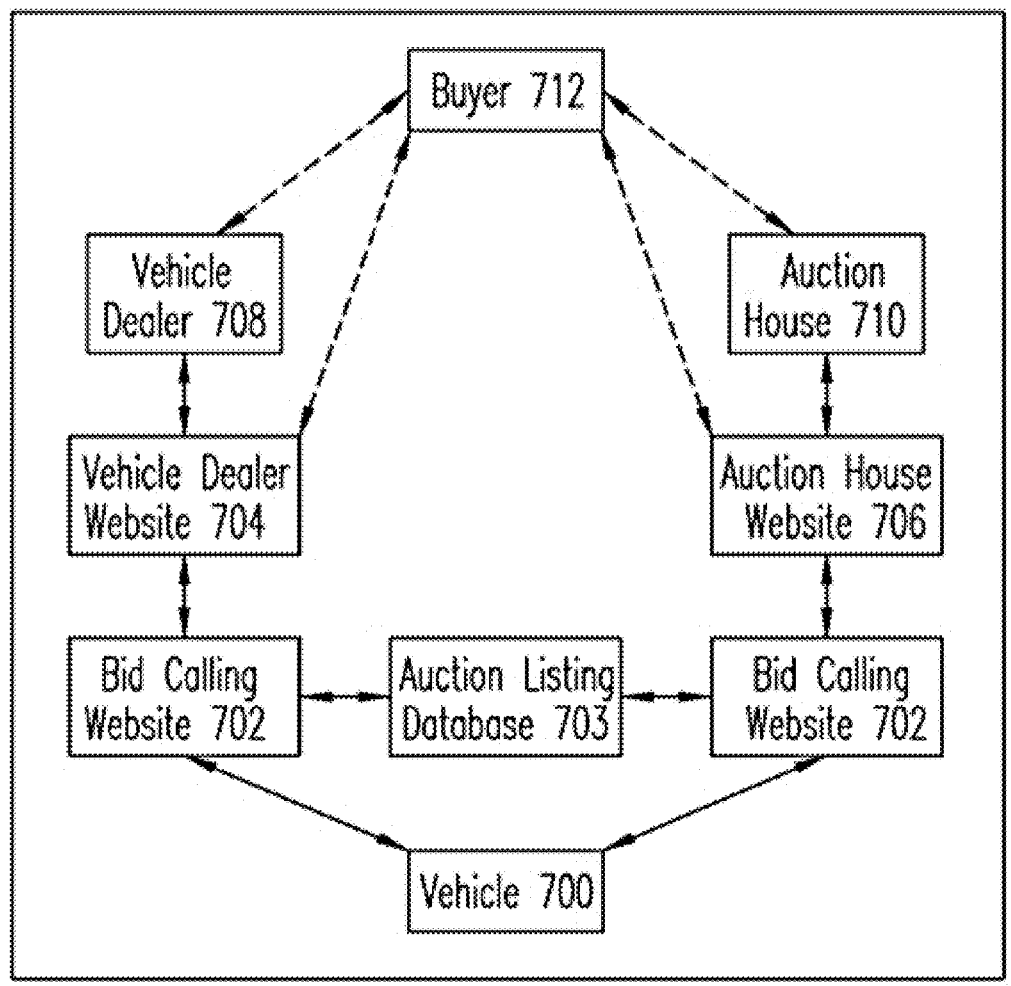
FIG. 16 is a plan view of an arrangement wherein a separate bid calling webpage is presented on the vehicle dealer website as well as on the auction house website.

Two Separate Bid Calling Webpages:

In one arrangement, the bid calling webpage 702 presented on the vehicle dealer website 704 and the bid calling webpage 702 on the auction house website 706 are two separate and distinct webpages, as is shown in FIG. 16. In this arrangement, the two webpages 702 sync dynamically with the auction listing database 703 in real-time such that the bidding is live and in real-time on both webpages. That is, buyers viewing a bid calling webpage 702 through the vehicle dealer website 704, and buyers viewing a bid calling webpage 702 through the auction house website 706 are privy to the same bidding information on each bid calling webpage 702.

In this arrangement, the two separate bid calling webpages 702 are each hosted on the server or some other location associated with the vehicle dealer 708, and the auction house 710, respectively. In this arrangement, the domain name used for the two bid calling webpages 702 is different, as is other content related to party through which the bid calling webpage 702 was arrived at.

Figure 21:
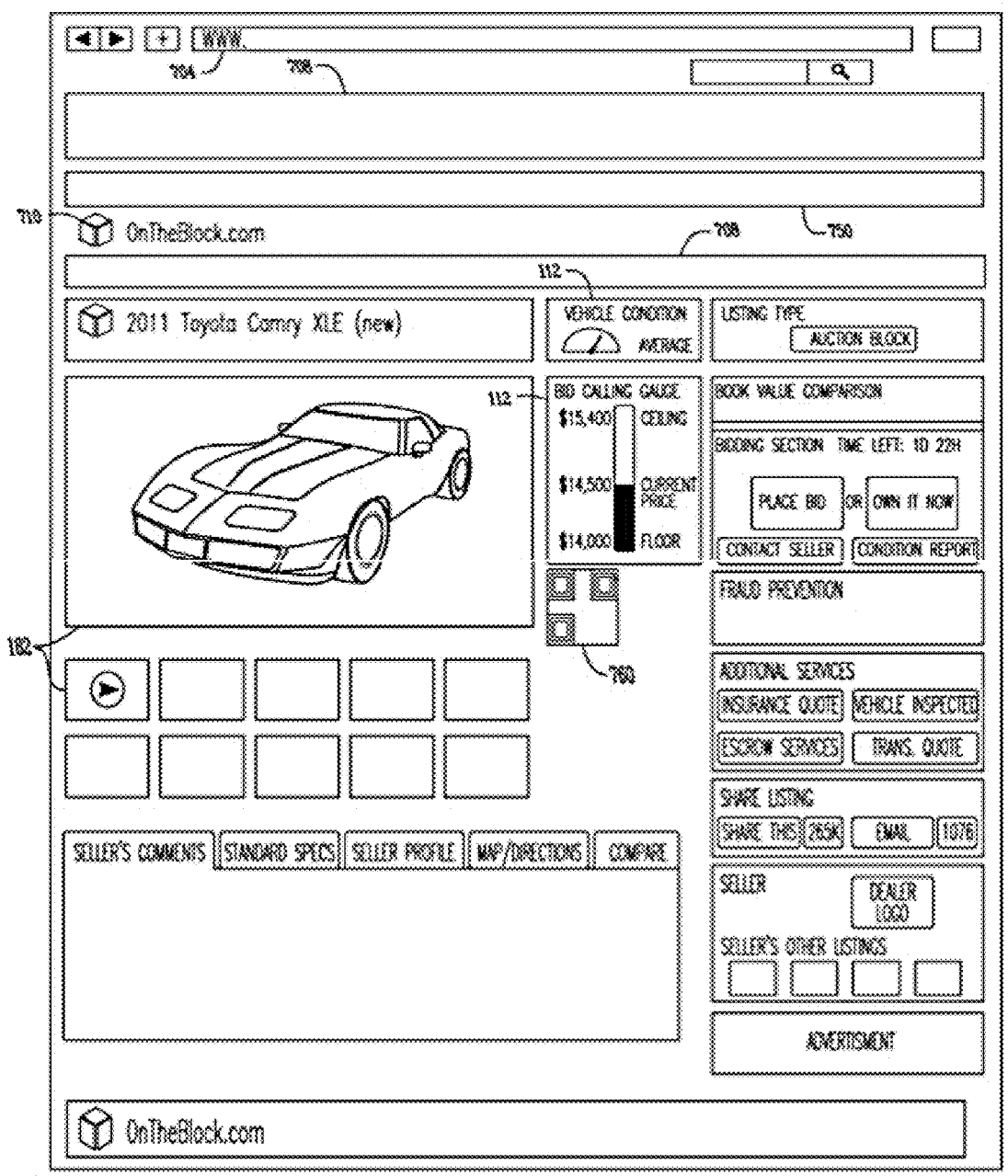
FIG. 21 is a plan view of a screen on the vehicle dealer website of a bid calling webpage, the webpage having an auction link and cobranding elements with both the vehicle dealer and the auction house.

Those skilled in the art will also appreciate that the bid calling webpage 702 which is located on the vehicle dealer website will also be accessible from a search results page co-branded with the auction house 710, which is located on the vehicle dealer website 704 and which displays only those vehicles listed by the vehicle dealer 708 which are currently listed on the auction house website 706. This is shown in FIGS. 21 and 22 wherein the buyer is on the vehicle dealer's website 704 with a content window that shows the auction listings for various vehicles 700 or bid calling webpage 702 for a vehicle 700 that is cobranded ("Auction Powered by OnTheBlock.com").

Domain Name:

A domain name is an identification string that defines a realm of administrative autonomy, authority, or control on the Internet. Domain names are formed by the rules and procedures of the Domain Name System (DNS). Technically, any name registered in the DNS is a domain name.

Domain names are used in various networking contexts and application-specific naming and addressing purposes. In general, a domain name represents an Internet Protocol (IP) resource, such as a personal computer used to access the Internet, a server computer hosting a website, or the website itself or any other service communicated via the Internet.

Domain names are organized in subordinate levels (sub-domains) of the DNS root domain, which is nameless. The first-level set of domain names are the top-level domains (TLDs), including the generic top-level domains (gTLDs), such as the prominent domains com, info, net and org, and the country code top-level domains (ccTLDs). Below these top-level domains in the DNS hierarchy are the second-level and third-level domain names that are typically open for reservation by end-users who wish to connect local area networks to the Internet, create other publicly accessible Internet resources or run web sites. The registration of these domain names is usually administered by domain name registrars who sell their services to the public.

A domain name consists of one or more parts, technically called labels that are conventionally concatenated, and delimited by dots. For the purposes of an example we will look at the following domain name to describe its parts or anatomy www.auctionexample.com/hondaaccord115

The right-most label conveys the top-level domain; for example, the domain name example belongs to the top-level domain "com".

The left-most label conveys the sub-domain; for example, the domain name example belongs to the sub-domain "www", which stands for "world wide web". The sub-domain allows the owner of the domain to channel different traffic to different parts of the website. Common sub-domains include www, mail, blog, stuff, etc.

The portion between the top level domain and the sub domain (said another way, the portion between the dots or periods) is what is referred to as the "domain name". For example, the domain name in the example belongs to the domain name "auctionexample". The domain name points or directs to which server to access for the website.

The portion after the top level domain is the "folder information". The folder information is separate from the domain name, can contain spaces and underscores, and informs us as to where to go once we reach the server and further informs us as to what information to retrieve from the server. For example, the folder information in the example is "hondaaccord115". That is, when the example domain is clicked upon or entered into a web browser the folder hondaaccord115 is accessed.

Therefore, in this example the domain name for the bid calling webpage 702 associated with the vehicle dealer website 704 would have the same domain name as the vehicle dealer website 704; similarly the bid calling webpage 702 associated with the auction house website 706 would have the same domain name as the auction house website 706. That is, if the vehicle dealer website 704 has the domain "www.stewhansens.com" the bid calling webpage 702 would similarly be under the same domain name "www.stewhansens.com" with folder information directing to the specific bid calling webpage 702 associated with that specific vehicle 700. Similarly, if the auction house website 706 has the domain "www.ontheblock.com" the bid calling webpage 702 would similarly be under the same domain name "www.ontheblock.com" with folder information directing to the specific bid calling webpage 702 associated with that specific vehicle 700. In this way, two separate bid calling webpages 702 are presented with different domain names. That is, in this example, the same vehicle 700 is presented on a bid calling webpage 702 at the following different web addresses:

www.stewhansens.com/hondaaccord115
www.ontheblock.com/hondaaccord115

This flexibility allows buyers to choose who it is that they more-directly deal with. Said another way, in the event the buyer has built a level of familiarity with the auction house 710 or the vehicle dealer 708, they can then choose to access the bid calling webpage 702 through that entity, thereby providing the buyer with an increased level of comfort when conducting a transaction with that party and thereby promoting more sales.

Figure 17:
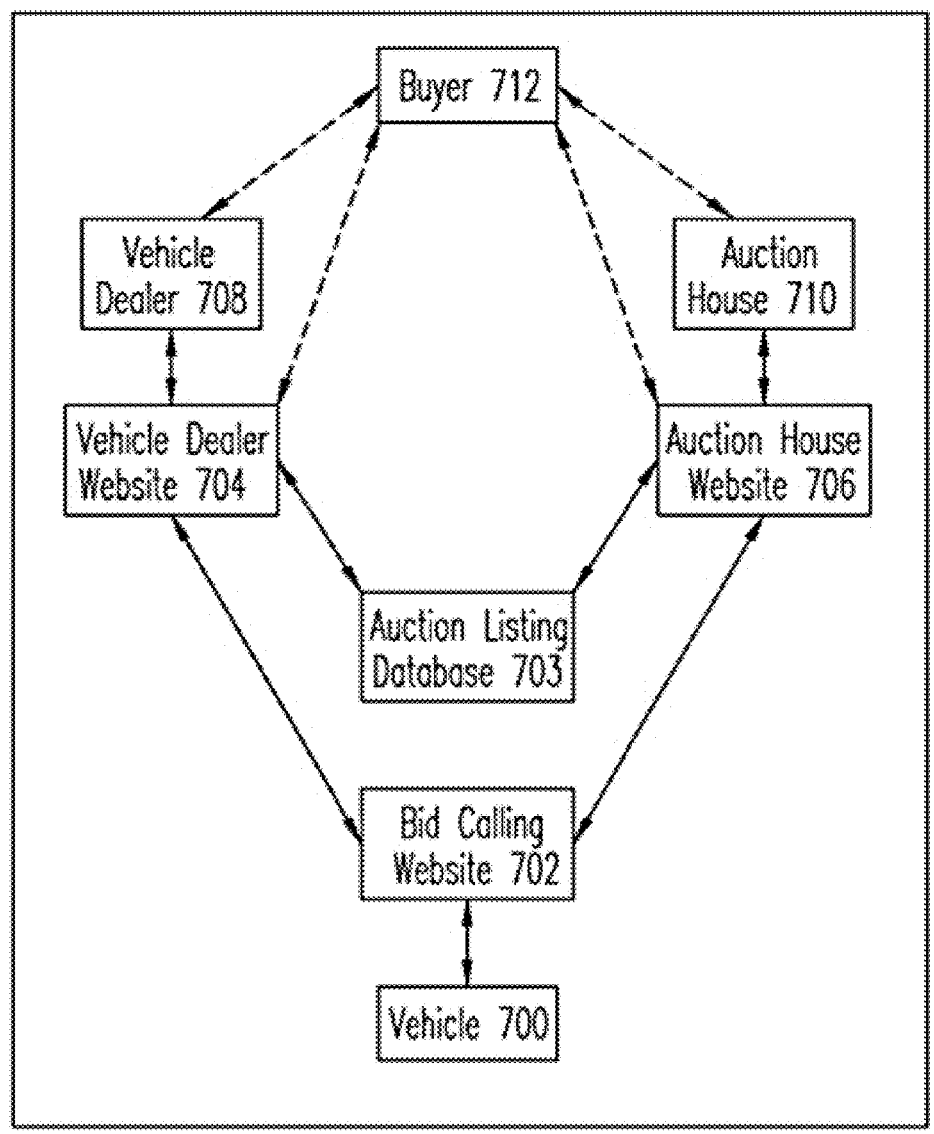
FIG. 17 is a plan view of an arrangement wherein a single bid calling webpage is accessible through the vehicle dealer website as well as through the auction house website.
Figure 18:
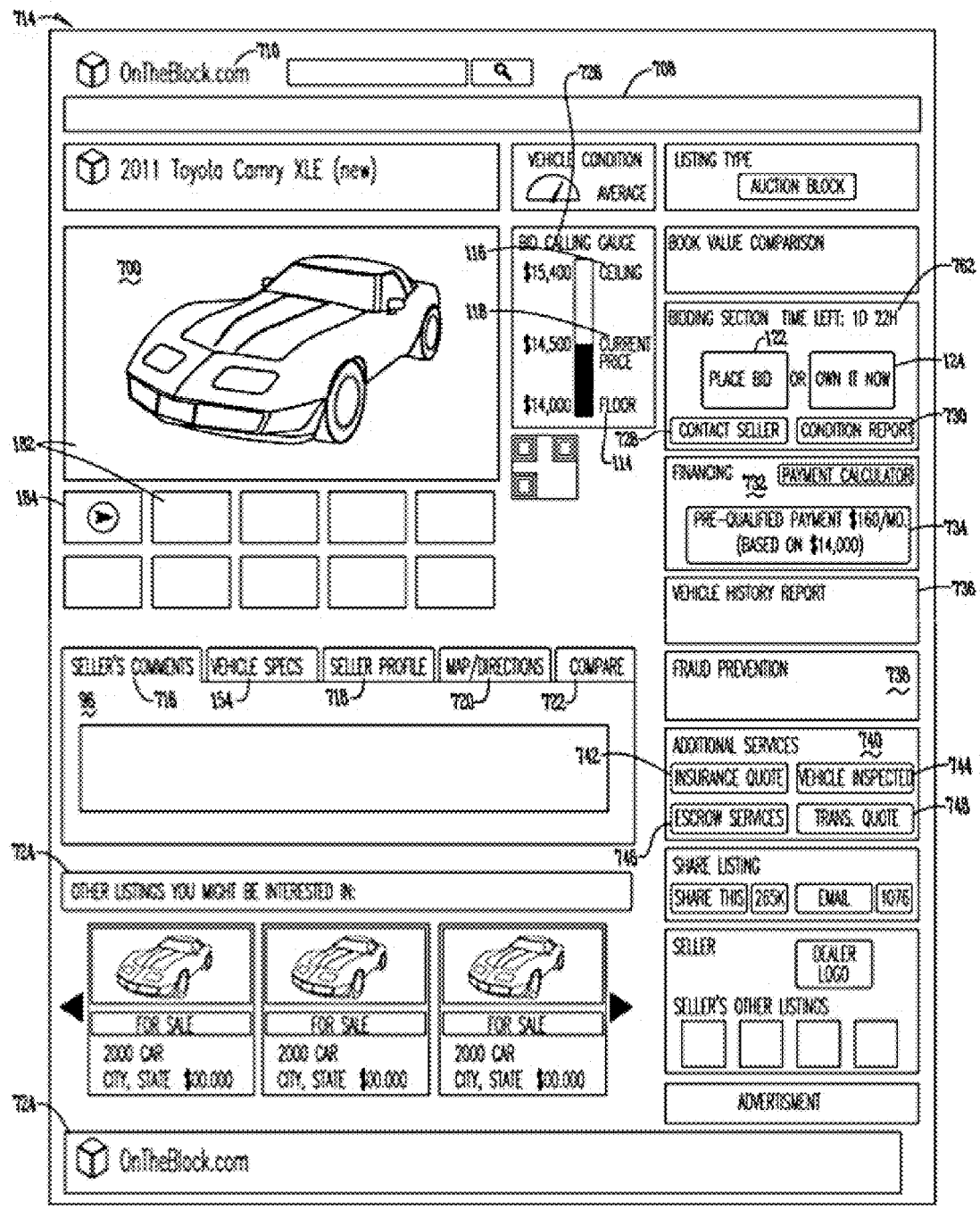
FIG. 18 is a plan view of a bid calling webpage presented on the vehicle dealer website, or alternatively on the auction house website, the bid calling webpage having cobranding elements with both the vehicle dealer and the auction house.
Figure 19:
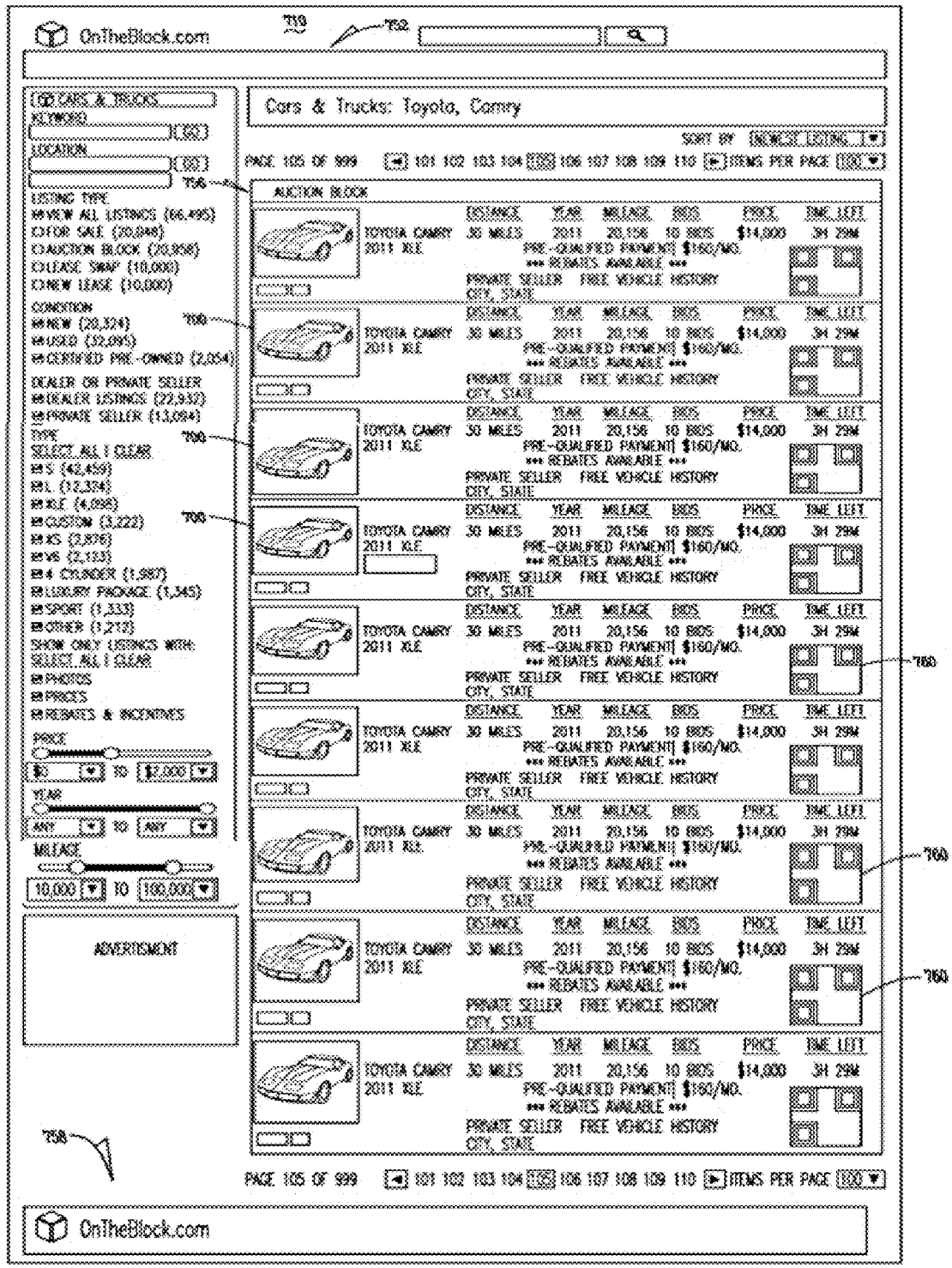
FIG. 19 is a plan view of a screen on the vehicle dealer website, or alternatively on the auction house website, of a list of vehicles that are being auctioned by the vehicle dealer through the auction house, the webpage having cobranding elements with both the vehicle dealer and the auction house.
Figure 20:
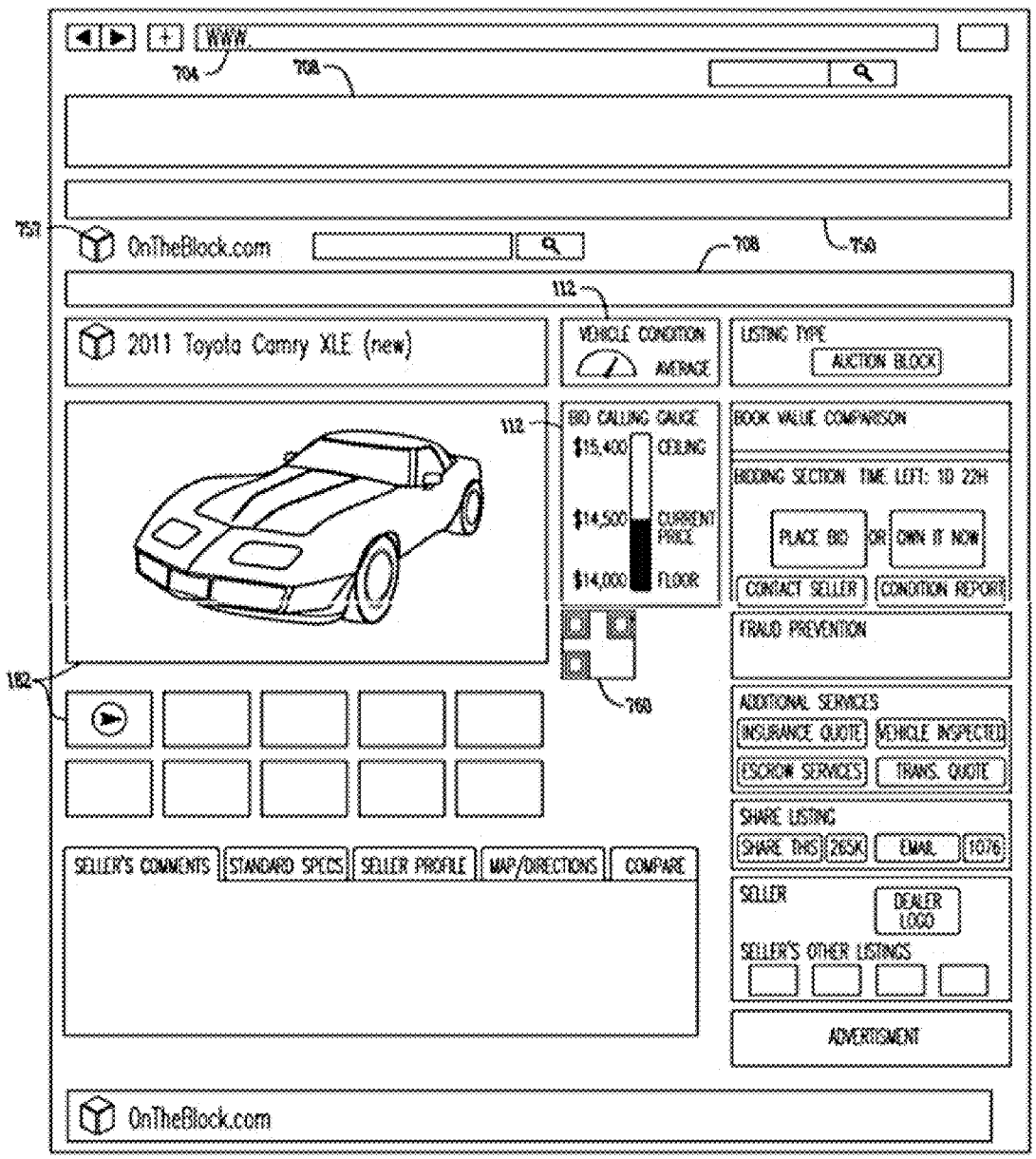
FIG. 20 is a plan view of a screen on the vehicle dealer website of a bid calling webpage, the webpage having cobranding elements with both the vehicle dealer and the auction house.

A Single Co-Branded Webpage:

In an alternative arrangement, a co-branded (between the vehicle dealer 708 and the suction house 710) bid calling webpage 702 separate from the bid calling webpage 702 located on the auction house website 706 or on the vehicle dealer website 704 is located on a single co-branded webpage, as is shown in FIG. 17. In this arrangement, the vehicle dealer website 704 links to this single co-branded bid calling webpage 702.

In this arrangement, the single co-branded bid calling webpage 702 is hosted on the server associated with the vehicle dealer 708, or the auction house 710, or a third party, and the vehicle dealer website 704 links to the single co-branded webpage. In this example, the co-branded bid calling webpage 702 exists alone, or in addition to the bid calling webpage 702 located on the auction house website 706.

Those skilled in the art will also appreciate that the bid calling webpage 702, which is located on the vehicle dealer website will also be accessible from a search results page co-branded with the auction house 710, which is located on the vehicle dealer website 704 and which displays only those vehicles listed by the vehicle dealer 708 which are currently listed on the auction house website 706. This "stand alone" website may also provide improved accessibility to internet search engines such as Google or Bing which may direct searchers directly to this bid calling webpage 702 without directing them first to the vehicle dealer website 704 or the auction house website 706.

Continuity of Experience:

Regardless of the manner in which the bid calling webpage 702 is accessed, either through the vehicle dealer website 704 or the auction house website 706, the bid calling webpage 702 is essentially identical, if not completely identical.

For purposes of continuity of experience for a buyer who accesses the bid calling webpage 702 through a vehicle dealer website 704, certain components of the vehicle dealer website 704 are retained. That is, as one example, with reference to FIGS. 19 and/or 20, the header 752 and/or the side bar 754 of the vehicle dealer website 704, as well as other layout or stylistic features are retained, so as to retain the overall look and feel of the vehicle dealer website 704.

Only the middle portion, or body 756 of the vehicle dealer website 704 changes and presents the content of the bid calling webpage 702.

This provides the buyer with continuity of experience, meaning that the buyer knows and has a continuous visual reassurance that they are still on the vehicle dealer website 704, or at least on a website that is strongly associated with the vehicle dealer website 704 or a website that is sponsored or approved by the vehicle dealer 708. In addition, the buyer can always click the header 752 to get back to the vehicle dealer website 704.

In this arrangement, when the buyer accesses the bid calling webpage 702 through a vehicle dealer website 704 there are cross-branding components. That is, the within the body 756 of bid calling webpage 702 presented on the vehicle dealer website 704, indications are presented that inform the buyer that the bid calling webpage 702 is associated with and/or hosted by the auction house 710 (such as "Auction Powered by OnTheBlock.com"). That is, a header 757 or footer 758 is presented that displays the name, logo and other identifying information of the auction house 710 and also presents links to other auctions hosted by the auction house 710. These indications provide the buyer with an instant and continuous reassurance that they are on a website that is collaboration between the vehicle dealer 708 and the auction house 710. As the user clicks through the system these co-branded elements are repeated throughout and on each and every page which helps reinforce to the user that they are on a collaborative website between the vehicle dealer 708 and the auction house 710.

QR Code:

Each vehicle listing also includes a QR code 760, which can be scanned by a buyer's handheld device, such as a smart phone or the like, and allows the buyer to quickly, easily and seamlessly access the bid calling webpage 702 though their handheld device.

Exclusivity:

One component of this system 10 is that when a vehicle dealer 708 lists a vehicle 700 for sale through the system 10/bid calling webpage 702 the listing is exclusive for at least the amount of time 762 that the auction lasts for. This is because if the vehicle 700 receives even a single bid the vehicle 700 will be sold. As such, while the vehicle 700 is at auction the vehicle 700 cannot be offered for sale or sold through any other means other than through the System 10. Alternatively, when the vehicle dealer 708 commits to list the vehicle 700 for auction, the vehicle dealer 708 must pay a penalty (such as $200) to terminate the auction. As an example, after the vehicle dealer 708 lists a vehicle 700 for auction someone walks onto their lot and wants to buy the vehicle 700. The vehicle dealer 708 then logs onto the auction house website 706, logs into their account and terminates the auction, before the vehicle 700 is purchased through the auction, pays the termination penalty to the auction house 710, and then the vehicle 700 can be sold by the vehicle dealer 708 to the buyer.

From the above discussion it will be appreciated that the system presented offers many advantages over the prior art. The system improves the efficiency of transacting vehicle purchases; the system improves the security of buying and selling vehicles on line; and the system presents a single site wherein a user can list a vehicle for sale, auction a vehicle, swap a lease, and have a vehicle purchased at auction on their behalf.

In addition, by the auction house 710 and the vehicle dealer 708 collaborating and working together with one another, this lends the vehicle dealer's following to the auction house, and allows the auction house to lend its following, expertise and sales methods to the sale of vehicles for the vehicle dealer. In this way, both the auction house and the vehicle dealer are benefited.

While this invention is described primarily with respect to "vehicles" this invention is not intended to be so limited. In addition to the vehicles, the System 10 and Website 20 may also be used to list, auction, buy and sell non-vehicle assets and property including but not limited to office furniture, office equipment, medical equipment, collectables, buildings, real property, etc.

It will be appreciated by those skilled in the art that other various modifications could be made to the device without parting from the spirit and scope of this invention. All such modifications and changes fall within the scope of the claims and are intended to be covered thereby.

What is claimed:

1. A method for online auction of a vehicle, the steps comprising:
providing an interactive user interface for entry of a selected unique vehicle identification;
transmitting the selected unique vehicle identification to a third party database comprising wholesale prices and a geographical location of the vehicle to determine pricing information based on the selected unique vehicle identification;
analyzing the pricing information to determine both of a minimum floor price and a maximum ceiling price for transfer of rights to the vehicle based on the pricing information;
generating a bid calling webpage specific for the vehicle and accessible on an auction house website displaying vehicle information comprising information extracted from the selected unique vehicle identification, pricing information derived from the third party database, and a vehicle location, wherein the auction house website has a unique domain name associated with the auction house;
generating a bid calling webpage specific for the same vehicle and accessible on a vehicle dealer website displaying information comprising the same information extracted from the selected unique vehicle identification, the same pricing information derived from the third party database, and a vehicle location, wherein the vehicle dealer website has a unique domain name associated with the vehicle dealer;
dynamically synching the bid calling webpage accessible on the auction house website and the bid calling webpage accessible on the vehicle dealer website in real time to an auction listing database; and
auctioning the vehicle through the bid calling webpage accessible on the auction house website and the bid calling webpage accessible on the vehicle dealer website simultaneously and in real time by simultaneously accepting at least one bid for the vehicle on either of the vehicle dealer bid calling webpage or the auction house bid calling webpage during a same limited and specified time, wherein each bid is equal to or greater than the minimum floor price and equal to or less than the maximum ceiling price.

2. The method of claim 1 wherein the bid calling website accessed through the vehicle dealer website and associated with the unique domain name associated with the vehicle dealer has a link to other vehicle inventory offered by the dealer.

3. The method of claim 1 wherein the bid calling website accessed through the auction house website, and associated with the unique domain name associated with the auction house has a link to other vehicle inventory offered by the auction house.

4. The method of claim 1 wherein the bid calling webpage accessed through the vehicle dealer website and the bid calling webpage accessed through the auction house website are synced to the same data in the auction listing database.

5. The method of claim 1 wherein the bid calling webpage accessed through the vehicle dealer website and the bid calling webpage accessed through the auction house website are updated in real-time to display a higher bid entered on either of the auction house bid calling webpage or the vehicle dealer bid calling webpage.

6. The method of claim 1 wherein bidding on the vehicles is live and interactive on both of the vehicle dealer website and the auction house website.

7. The method of claim 1 further comprising the step of providing an option for a user to elect to auction the vehicle by approving a revised minimum price for the vehicle not greater than the minimum floor price and or a maximum price for the vehicle not greater than the maximum ceiling price.

8. The method of claim 7 wherein a seller of the vehicle has the ability to lower the minimum floor price amount.

9. The method of claim 7 wherein a seller of the vehicle has the ability to lower the maximum ceiling price amount.

10. The method of claim 7 wherein a seller of the vehicle cannot raise the minimum floor price amount.

11. The method of claim 7 wherein a seller of the vehicle cannot raise the maximum ceiling price amount.

12. The method of claim 1 wherein the bid calling webpage is accessed through the vehicle dealer website, is hosted on the vehicle dealer website.

13. The method of claim 1 wherein the bid calling webpage accessed through the auction house website, is hosted on the auction house website.

14. The method of claim 1 wherein a vehicle is exclusively for sale through the online auction.

15. The method of claim 1 wherein the bid calling webpage is accessed through the vehicle dealer website, is presented with cobranding of the vehicle dealer and the auction house.

16. The method of claim 1 wherein the bid calling webpage accessed through the vehicle dealer website, is comprised of a link displaying other vehicles offered for auction by the vehicle dealer through the auction house.

17. The method of claim 1 wherein the bid calling webpage is accessed through the vehicle dealer website, is comprised of a link displaying other vehicles offered by the auction house.

18. The method of claim 1 wherein the bid calling webpage presented to a winning bidder of the auction contains links to optional services consisting of insurance, appraisal, transportation, financing, and combinations thereof.

* * * * *